United States Patent
Hetang et al.

(10) Patent No.: US 12,466,432 B2
(45) Date of Patent: Nov. 11, 2025

(54) AUTONOMOUS VEHICLE DRIVING PATH LABEL GENERATION FOR MACHINE LEARNING MODELS

(71) Applicant: Waymo LLC, Mountain View, CA (US)

(72) Inventors: Congrui Hetang, Mountain View, CA (US); Ningshan Zhang, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 649 days.

(21) Appl. No.: 17/740,215

(22) Filed: May 9, 2022

(65) Prior Publication Data

US 2023/0356748 A1 Nov. 9, 2023

(51) Int. Cl.
*B60W 60/00* (2020.01)
*G05B 13/02* (2006.01)

(52) U.S. Cl.
CPC ..... *B60W 60/0011* (2020.02); *G05B 13/0265* (2013.01)

(58) Field of Classification Search
CPC ........... B60W 60/0011; G05B 13/0265; G06N 3/084; G06N 3/0895
See application file for complete search history.

(56) References Cited

U.S. PATENT DOCUMENTS

| | | | | |
|---|---|---|---|---|
| 8,457,827 B1 * | 6/2013 | Ferguson | ........ | B60W 60/00276 701/28 |
| 9,612,123 B1 * | 4/2017 | Levinson | ............... | B60Q 1/508 |
| 11,061,398 B2 * | 7/2021 | Levinson | ............... | B60Q 1/503 |
| 11,340,622 B2 * | 5/2022 | Refaat | .................... | G06N 20/10 |
| 2014/0088855 A1 * | 3/2014 | Ferguson | ............... | G08G 1/166 701/117 |
| 2015/0175168 A1 * | 6/2015 | Hoye | .................... | B60W 40/09 434/64 |
| 2017/0132334 A1 * | 5/2017 | Levinson | .............. | B60W 50/00 |
| 2018/0164822 A1 * | 6/2018 | Chu | ........................ | G05D 1/0217 |
| 2018/0374359 A1 * | 12/2018 | Li | .......................... | G06V 20/58 |
| 2019/0072973 A1 * | 3/2019 | Sun | ....................... | B62D 15/025 |
| 2019/0086925 A1 * | 3/2019 | Fan | ....................... | G05D 1/0088 |
| 2019/0303759 A1 * | 10/2019 | Farabet | .................. | G06N 3/045 |
| 2019/0361432 A1 * | 11/2019 | Levinson | ................ | H04L 67/10 |
| 2021/0080955 A1 * | 3/2021 | Wilkinson | ......... | B60W 60/0011 |
| 2021/0309248 A1 * | 10/2021 | Choe | ........................ | G06N 3/04 |

(Continued)

*Primary Examiner* — Mussa A Shaawat
(74) *Attorney, Agent, or Firm* — Lowenstein Sandler LLP

(57) ABSTRACT

A system identifies a set of input data including a roadgraph identifying an intermediate autonomous vehicle (AV) driving path related to a scene representing an environment proximate an AV. The intermediate AV driving path reflects a modification to an initial (AV) driving path to avoid one or more obstacles obstructing the initial AV driving path. The system performs, using the set of input data, a path adjustment operation that identifies one or more candidate AV driving paths based on the intermediate AV driving path and determines a cost value for each of the candidate AV driving paths. The system identifies, among the candidate AV driving paths, a final AV driving path having a cost value that satisfies an evaluation criterion. The final AV driving path is to be included in the set of training data as a target output paired with training input including scene data identifying the scene.

21 Claims, 13 Drawing Sheets

(56) References Cited

U.S. PATENT DOCUMENTS

| | | | | |
|---|---|---|---|---|
| 2021/0312177 | A1* | 10/2021 | Bansal | B60W 60/00274 |
| 2021/0364305 | A1* | 11/2021 | Rizk | G01C 21/3605 |
| 2022/0135078 | A1* | 5/2022 | Refaat | G06N 20/00 |
| | | | | 701/25 |
| 2023/0212837 | A1* | 7/2023 | Kikani | E02F 9/2203 |
| | | | | 701/50 |
| 2024/0005177 | A1* | 1/2024 | Singh | G06N 3/09 |
| 2024/0028031 | A1* | 1/2024 | Kentley-Klay | G01S 17/931 |
| 2024/0384510 | A1* | 11/2024 | Kikani | G06N 3/08 |

* cited by examiner

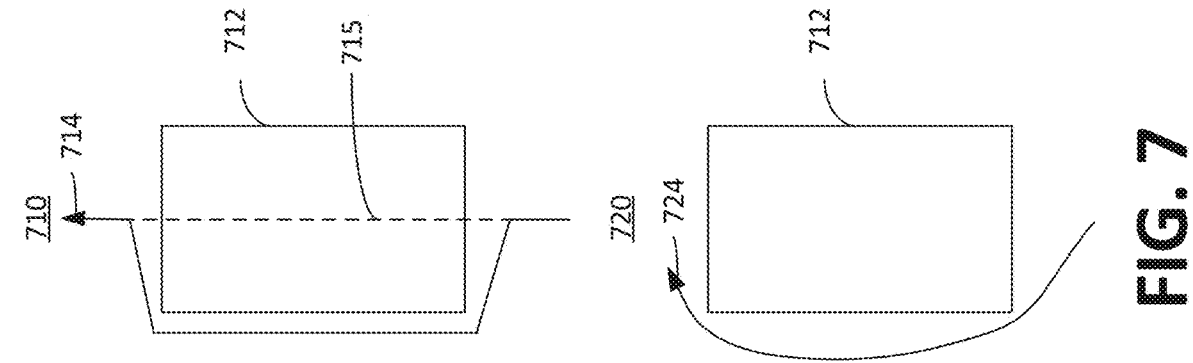
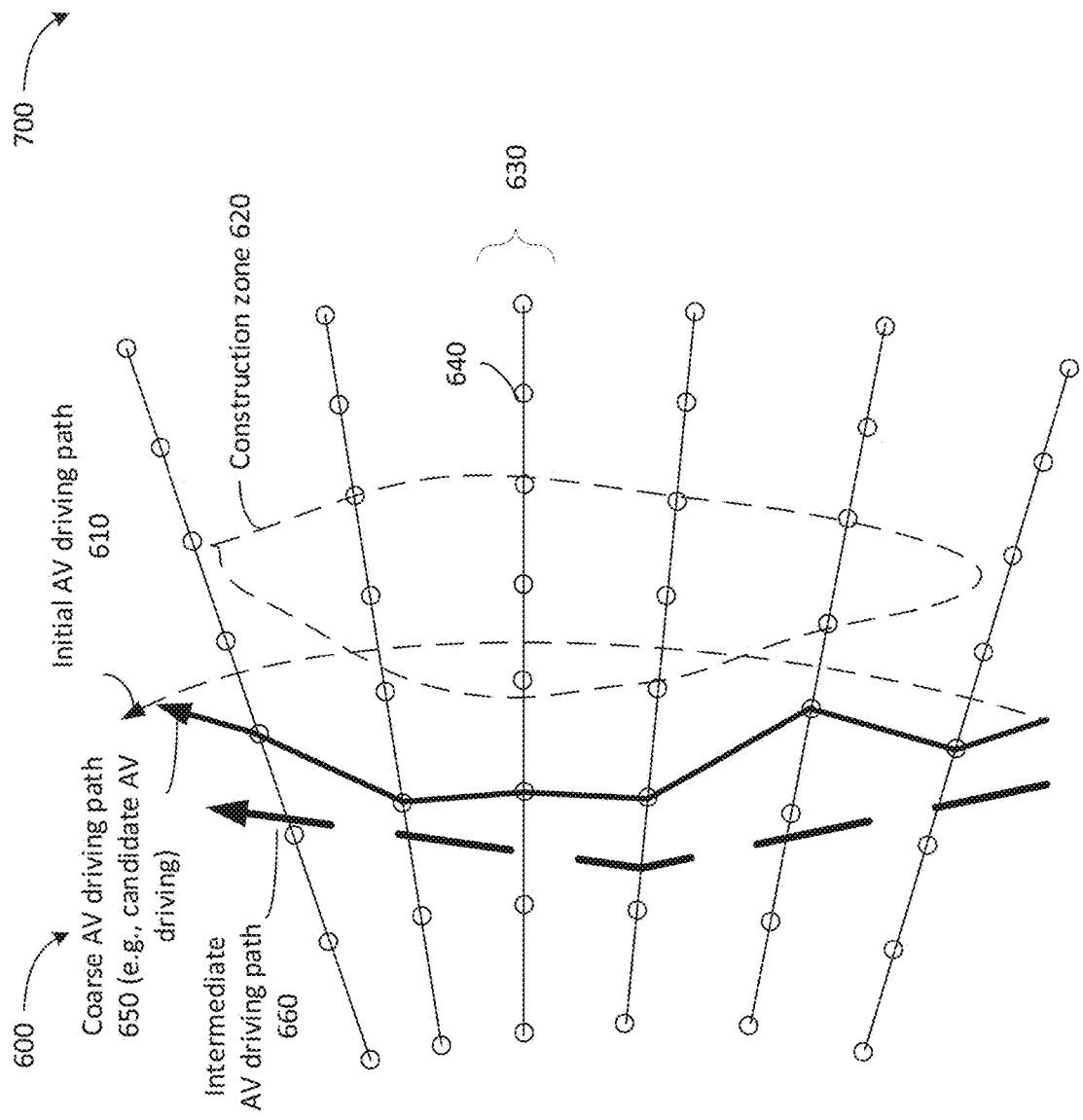
FIG. 7
FIG. 6

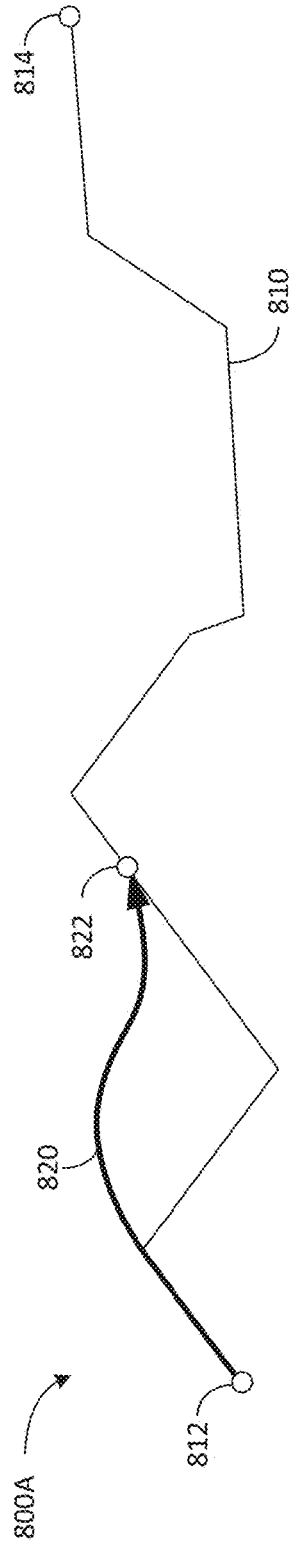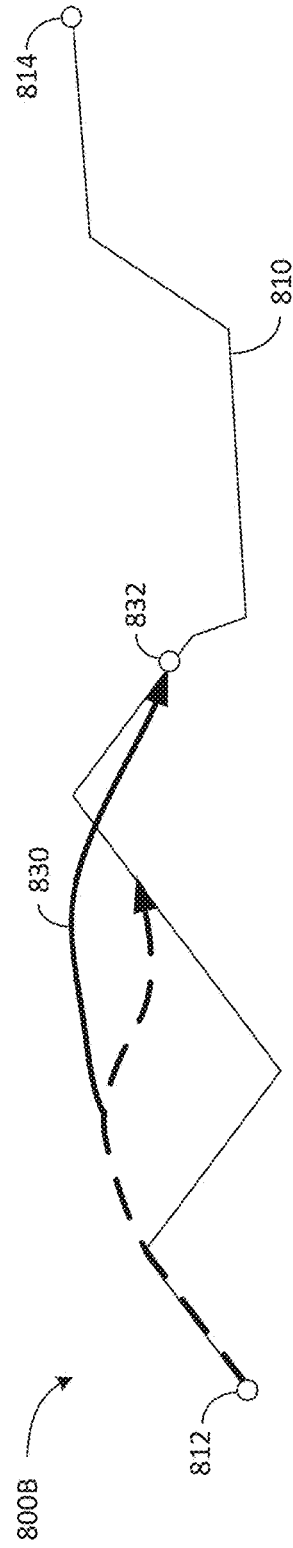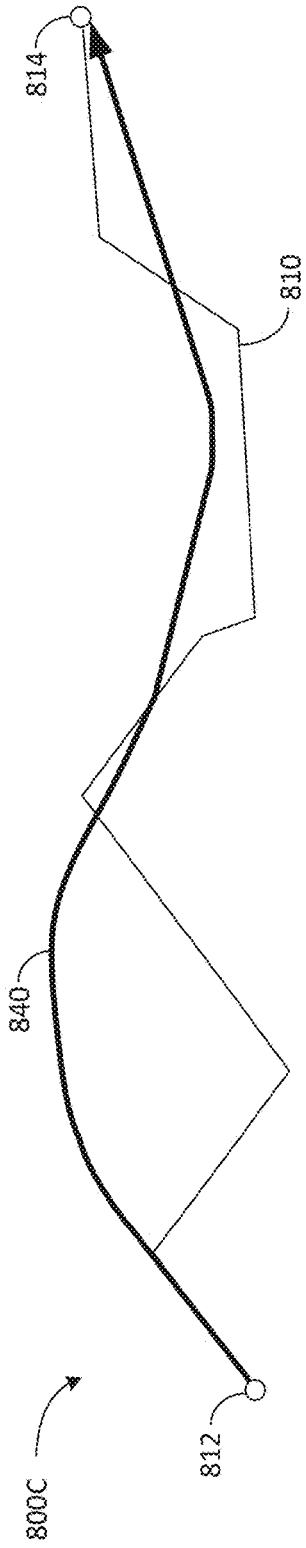

AUTONOMOUS VEHICLE DRIVING PATH LABEL GENERATION FOR MACHINE LEARNING MODELS

TECHNICAL FIELD

The instant specification generally relates to autonomous vehicles. More specifically, the instant specification relates to autonomous vehicle driving path label generation for machine learning models.

BACKGROUND

An autonomous (fully and partially self-driving) vehicle (AV) operates by sensing an outside environment with various electromagnetic (e.g., radar and optical) and non-electromagnetic (e.g., audio and humidity) sensors. Some autonomous vehicles chart a driving path through the environment based on the sensed data. The driving path can be determined based on Global Positioning System (GPS) data and road map data. While the GPS and the road map data can provide information about static aspects of the environment (buildings, street layouts, road closures, etc.), dynamic information (such as information about other vehicles, pedestrians, streetlights, etc.) is obtained from contemporaneously collected sensing data. Precision and safety of the driving path and of the speed regime selected by the autonomous vehicle depend on timely and accurate identification of various objects present in the driving environment and on the ability of a driving algorithm to process the information about the environment and to provide correct instructions to the vehicle controls and the drivetrain.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular embodiments of the disclosure or any scope of the claims. Its sole purpose is to present some concepts of the disclosure in a simplified form as a prelude to the more detailed description that is presented later.

An aspect of the disclosure includes a system to generate a set of training data for training a machine learning model, comprising: a memory device; and a processing device, operatively coupled to the memory device, to: identify a set of input data comprising a roadgraph identifying an intermediate autonomous vehicle (AV) driving path related to a scene representing an environment proximate an AV, the intermediate AV driving path reflecting a modification to an initial (AV) driving path to avoid one or more obstacles obstructing the initial AV driving path; perform, using the set of input data, a path adjustment operation that identifies one or more candidate AV driving paths based on the intermediate AV driving path and determines a cost value for each of the one or more candidate AV driving paths; and identify, among the one or more candidate AV driving paths, a final AV driving path having a cost value that satisfies an evaluation criterion, wherein the final AV driving path is to be included in the set of training data as a target output paired with training input comprising scene data identifying the scene.

In some embodiments, the path adjustment operation identifies the one or more candidate AV driving paths that avoid the one or more obstacles based on one or more cost terms comprising a follow path cost term that encourages the one or more candidate AV driving paths to stay close to the intermediate AV driving path.

In some embodiments, the one or more cost terms comprise one or more of a lane cost term that discourages the one or more candidate AV driving paths from deviating from an initial lane, a smooth path cost term that encourages the one or more candidate AV paths to be smooth, or an obstacle cost term that forbids the one or more candidate AV driving paths to hit the one or more obstacles.

In some embodiments, the intermediate AV driving path comprises a polyline path, and wherein the final AV driving path comprises a continuous curved path with continuous curvatures.

In some embodiments, the scene comprises a construction zone scene, and wherein the one or more obstacles are of the construction zone scene.

In some embodiments, the final AV driving path comprises at least one of: a path shift with respect to the initial AV driving path, or a path merge into another autonomous vehicle driving path of the roadgraph.

In some embodiments, to perform, using the set of input data, the path adjustment operation that identifies the one or more candidate AV driving paths that avoid the one or more obstacles, the processing device to: perform a coarse adjustment operation that generates, based on the one or cost terms, a coarse AV driving path comprising a polyline path; and perform a fine adjustment operation that generates, based on the coarse AV driving path, the final AV driving comprising a continuous curved path having one or more continuous curvatures.

In some embodiments, the processing device further to: provide the set of training data to train the machine learning model.

An aspect of the disclosure includes a method for training a machine learning model using information pertaining to an autonomous vehicle (AV) driving path that avoids one or more obstacles of a construction zone, the method comprising: generating training data for the machine learning model, wherein generating the training data comprises: generating first training input, the first training input comprising scene data of a scene representing a an environment that is proximate an AV and that includes the one or more obstacles of the construction zone; and generating a first target output for the first training input, wherein the first target output identifies a final AV driving path that avoids the one or more obstacles of the construction zonewherein the final AV driving path was generated using a set of input data with a path adjustment operation, the set of input data comprising a roadgraph identifying an intermediate autonomous vehicle (AV) driving path related to and reflecting a modification to an initial (AV) driving path to avoid the one or more obstacles obstructing the initial AV driving path, wherein the path adjustment operation identifies, among one or more candidate AV driving paths, the final AV driving path based on the intermediate AV driving path and a cost value for each of the one or more candidate AV driving paths; and, providing the training data to train the machine learning model on (i) a set of training inputs comprising the first training input, and (ii) a set of target outputs comprising the first target output.

In some embodiments, the path adjustment operation identifies the one or more candidate AV driving paths that avoid the one or more obstacles based on one or more cost terms comprising a follow cost term that encourages the one or more candidate AV driving paths to stay close to the intermediate AV driving path.

In some embodiments, the one or more cost terms comprise one or more of a lane cost term that discourages the one or more candidate AV driving paths to deviate from an initial lane, a smooth path cost term that encourages the one or more candidate AV paths to be smooth, or an obstacle cost term that forbids the one or more candidate AV driving paths to hit the one or more obstacles.

In some embodiments, the intermediate AV driving path comprises a polyline path, and wherein the final AV driving path comprises a continuous curved path with one or more continuous curvatures.

In some embodiments, the path adjustment operation comprises: a coarse adjustment operation that generates, based on the one or cost terms, a coarse AV driving path comprising a polyline path, and a fine adjustment operation that generates, based on the coarse AV driving path, the final AV driving comprising a continuous curved path with one or more continuous curvatures.

In some embodiments, first training input is mapped to the first target output.

An aspect of the disclosure includes a method for using a trained machine learning model to identify an autonomous vehicle (AV) driving path that avoids one or more first obstacles of a construction zone, the method comprising: providing to the trained machine learning model first input comprising scene data of a first scene representing a an environment that is proximate an AV and that includes the one or more first obstacles of the construction zone; and obtaining, from the trained machine learning model, one or more outputs identifying (i) an indication of the AV driving path that avoids the one or more first obstacles of the construction zone, and (ii) a level of confidence that the AV driving path avoids the one or more first obstacles of the construction zone, wherein the trained machine learning model was trained using a set of training data comprising a target output comprising a final AV driving path that was generated using a set of input data with a path adjustment operation, the set of input data comprising a roadgraph identifying an intermediate autonomous vehicle (AV) driving path related to and reflecting a modification to an initial (AV) driving path to avoid one or more second obstacles obstructing the initial AV driving path.

In some embodiments, the path adjustment operation identifies the one or more candidate AV driving paths that avoid the one or more second obstacles based on one or more cost terms comprising a follow cost term that encourages the one or more candidate AV driving paths to stay close to the intermediate AV driving path.

In some embodiments, the method further comprising: determining whether the level of confidence associated with AV driving path exceeds a threshold level of confidence; and responsive to determining that the level of confidence of the AV driving path exceeds the threshold level of confidence, causing a performance of a vehicle operation to direct the AV along the AV driving path.

In some embodiments, the AV driving path comprises a polyline path, and wherein the final AV driving path comprises a continuous curved path with one or more continuous curvatures.

In some embodiments, the path adjustment operation comprises: a coarse adjustment operation that generates, based on the one or cost terms, a coarse AV driving path comprising a polyline path.

In some embodiments, the path adjustment operation comprises: a fine adjustment operation that generates, based on the coarse AV driving path, the final AV driving comprising a continuous curved path having one or more continuous curvatures.

A further aspect of the disclosure provides a system comprising: a memory; and a processing device, coupled to the memory, the processing device to perform a method according to any aspect or embodiment described herein. A further aspect of the disclosure provides a computer-readable medium comprising instructions that, responsive to execution by a processing device, cause the processing device to perform operations comprising a method according to any aspect or embodiment described herein. A further aspect of the disclosure provides a method according to any aspect or embodiment described herein.

BRIEF DESCRIPTION OF THE DRAWINGS

The disclosure is illustrated by way of examples, and not by way of limitation, and can be more fully understood with references to the following detailed description when considered in connection with the figures, in which:

FIG. 6 is a diagram illustrating an example of a coarse adjustment operation performed to obtain at least one coarse AV driving path, in accordance with some implementations of the disclosure.

FIG. 7 is a diagram illustrating a coarse AV driving path and a fine AV driving path, in accordance with some implementations of the disclosure.

FIGS. 8A-8C are diagrams illustrating an example of a path adjustment operation performed to obtain at least one fine AV driving path, in accordance with some implementations of the disclosure.

DETAILED DESCRIPTION

Figure 1:
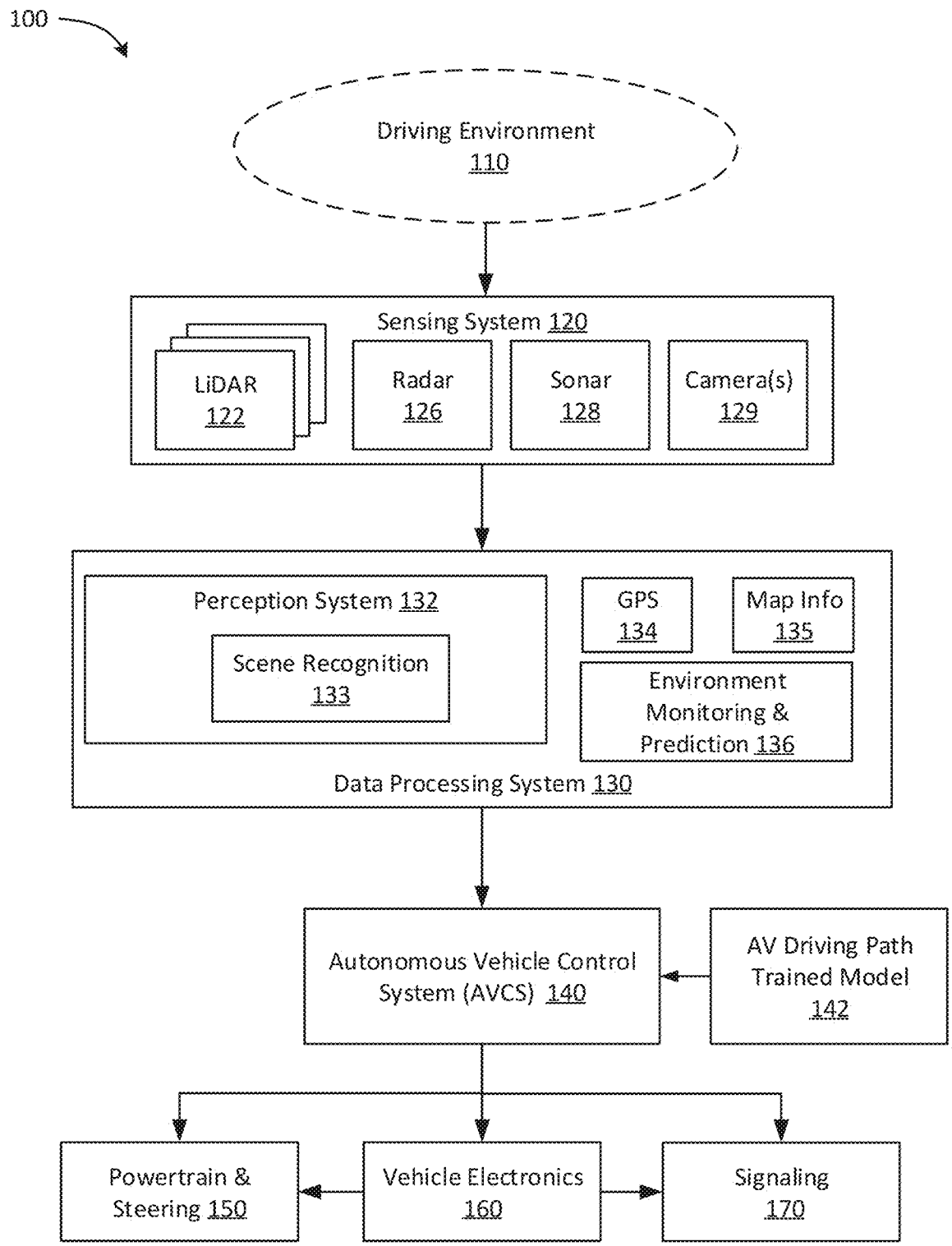
FIG. 1 is a diagram illustrating components of an example autonomous vehicle, in accordance with some implementations of the disclosure.

Aspects of the present disclosure relate to autonomous vehicle driving path label generation for machine learning models. Generally, a machine learning model is trained to find a driving path for a vehicle given a specific driving environment. However, the existing technology requires significant amount of training data, which is not easily available, is prone to user subjectivity and expensive to produce in sufficient quantities. In particular, a vehicle generally travels a route from a starting location to a destination location while encountering diverse driving environments. Routes can include segments that have different grades (e.g., elevations, pitches, uphill, downhill) of different lengths. Routes can also include segments that have different radius of curvature (e.g., winding roads of different lengths and grades). Some route segments are associated with historical data, such as historically windy segments, historically high-traffic segments, historically recommended lanes in segments, etc.

An autonomous vehicle (AV) performs vehicle actions, such as braking, steering, and throttling, to move the AV from the starting location to the destination location along the route. The AV has a planning module that receives route data (e.g., from a server) that includes particular roads to travel from the starting location to the destination location. The planning module (also referred to herein as a "routing module") receives sensor data from the perception system (e.g., vehicle sensors) that indicates locations of other objects. The routing module uses the sensor data and the route data to generate short time horizon routing data to navigate along an AV driving path. The short time horizon routing data includes instructions of how to control the AV over a short interval of time (e.g., the next 10 seconds). The short time horizon routing data may be generated (e.g., regenerated, refreshed) very frequently (e.g., every 100 milliseconds (ms)). By being generated very frequently, the short time horizon routing data can reflect changes in the vehicle or the world (e.g., engine degradation, other objects changing course or speed or appearing suddenly). The routing module provides the short time horizon routing data to the motion control module. The motion control module controls the vehicle systems over the next interval of time (e.g., the next 10 seconds, next 100 ms) based on the short time horizon plan data (e.g., and the refreshed or regenerated short time horizon plan). The routing module continues generating (e.g., refreshing) new short time horizon routing data for the subsequent intervals of time based on the route data and the current sensor data from the perception system. The motion control module continues controlling the vehicle based on the new short time horizon plan data.

In some instances, the AV may travel a route by navigating along one or more AV driving paths. The route can correspond to higher-scale mission planning (e.g., the specific roads to travel from starting point to final destination), while a path may be more granular, correspond to a given local environment (e.g., scene), which can be navigated using short time horizon routing data.

Construction zones are one type of scene (e.g., the local environment proximate to the AV) around or through which AVs can struggle to navigate. Machine learning models used by AVs to navigate around construction zones can require large amounts of construction zone data for training. For example, a machine learning model can include a supervised machine learning model that is trained using a set of features used as input that are paired with a label that is used as a known output. In training a machine learning model for navigation around a construction zone, the set of features used as input to train the machine learning model can include a map having identifiers of objects of the construction zone and a label that can include a driving path the represents the correct and/or efficient path the vehicle can take to avoid the obstacles of the construction zone. The construction zone data can include construction zone scene data (e.g. features) identifying elements (e.g., obstacles, road, etc.) of the construction zone scene and ground-truth labels (e.g., AV driving paths) identifying how the AV is to navigate around the obstacles of construction zones. Conventionally, construction zone data is collected from real-world scenarios ("real construction zone data") and some real construction zone data can be labeled by humans to generate feature-label pairs for training machine learning models. For example, a human may draw, on an electronic map, an AV driving path that avoids the obstacles of the construction zone. Such human-labeled construction zone data (e.g., human-drawn driving path) can be expensive and non-trivial to create, prone to human errors, contain artifacts of human preferences (which can create dataset noise), and include path elements that are difficult for an AV to navigate (e.g., angular, rather than smooth turns). Moreover, effectively training machine learning models for navigation around construction zones using conventional human-labeled construction zone data can lead to poor AV driving performance due to the human errors, artifacts of human preferences, and the difficult to navigate path elements.

Aspects of the disclosure address the above challenges, among others, by generating a final AV driving path (e.g., label) using a path adjustment operation that can generate smooth and continuous AV driving paths with minimal human input. The path adjustment operation can be performed using a set of input data including a roadgraph. The roadgraph can include an intermediate AV driving path that is related to a scene that represents the environment local to the AV (e.g., immediate surrounding). Further, the intermediate AV driving path can identify coarse modifications to an initial AV driving path to avoid one or more obstacles of a construction zone. The coarse modifications to the initial AV driving path can create a low-resolution polyline path, such as an AV driving path that includes low-resolution discrete straight-line segments. The initial AV driving path can represent the original AV driving path of the AV where no construction zone is present. The original AV driving path can be obstructed or blocked due to the presence of the construction zone. The intermediate AV driving path can be a coarse approximation of an AV driving path (e.g., a low-resolution polyline path—an AV driving path that includes discrete straight-line segments) that avoids the obstacles of the construction zone. For example, the intermediate AV driving path can be a human-generated AV driving path that includes straight-line segments that connect to vertices of a graph having low resolution (e.g., meters between vertices). The path adjustment operation can be performed using the set of input data to identify one or more candidate AV driving paths that are each associated with a cost value (corresponding to a cost function). For example, the path adjustment operation can identify one or more candidate AV driving paths that avoid one or more obstacles based on one or more cost terms that includes a "follow path" cost term that encourages the candidate AV driving paths to stay close to the intermediate AV driving path. A cost term can include parameter(s) and/or value(s) (e.g., of a cost function) that encourage or discourage particular path configurations by respectively lowering or raising (e.g., penalizing) the cost of particular path characteristics, such that a cost value associated with a particular candidate AV driving path reflects the aggregate cost of the path characteristics of the AV driving path. A final AV driving path can be identified, among the candidate AV driving paths, based on a cost value that satisfies an evaluation criterion. For example, the final AV driving path can have the lowest cost value (e.g., optimal cost value) among the candidate AV driving paths. The final AV driving path can be included in a set of training data as target output where the target output can be paired with training input that includes scene data that identifies the construction zone scene.

In some implementations, to perform the path adjustment operation a multi-stage path adjustment operation can be performed. In an initial stage, a coarse adjustment operation generates, based on the cost terms, a coarse AV driving path that includes a polyline path. In some implementations, the polyline path of the coarse adjustment operation can be a higher resolution path than the polyline path of the intermediate AV driving path. In some implementations, the subsequent stage of the path adjustment operation can include a fine adjustment operation that generates, based on the coarse AV driving path, the final AV driving path that includes a smooth continuous curved path having one or more continuous curvatures.

As noted above, a technical problem addressed by implementations of the disclosure includes generating training data for a machine learning model, and in particular generating AV driving path labels that correspond to AV navigation around a construction zone.

Another technical problem addressed by implementations of the disclosure includes training machine learning models for navigation around construction zones (and implementing such trained machine learning models).

A technical solution to the above identified technical problems may include generating a final AV driving path (e.g., label) using a path adjustment operation that uses a set of inputs that includes an intermediate AV driving path reflecting coarse modifications to an initial AV driving path to avoid one or more obstacles of a construction zone.

Another technical solution to the above-identified technical problems may include training a machine learning model using a set of training data that includes the final AV driving path as target output where the final target output is paired with training input that includes scene data that identifies the construction zone scene.

Thus, the technical effect may include generating AV driving path labels (e.g., final AV driving path) that can reduce and/or eliminate human errors, reduce noise in the training data due to human preferences, and improve the geometric quality of the AV driving paths, thereby improving the AV driving performance (e.g., better fuel economy, smoother driving experience, etc.)

A "scene" can refer to the environment proximate (e.g., local to, such as within meters) to the AV. The scene can be represented by scene data that electronically (e.g., digital and/or analog data) represents a scene. In some instances, the scene data can include or reflect information of the sensing system of the AV (e.g., sensing system) such as one or more of LiDAR data, radar data, sonar data, image data, infrared data that represent the environment proximate to the AV. The scene data can be data that an AV uses to sense or interpret the environment proximate that AV.

A "construction zone" can refer to a particular type of scene that includes one or more obstacles (e.g., cones, open trenches, construction equipment, removed or move road features, such as walls, asphalt, signs, lanes, etc.). The construction zone scene can include objects that are not included in the original scene (e.g., the same scene or road prior to including the construction zone). The construction zone can be represented by scene data, such as construction zone scene data. It can be noted that aspects of the disclosure are described with respect to a construction zone, for purposes of illustration, rather than limitation. Aspects of the disclosure can be applied to any type of scene, and to generating training data for a machine learning model used to navigate around the obstacles of any particular type of scene.

A "roadgraph" can represent the features, such as static features, of a road and/or environment proximate to the road. Such features can include lanes, road markings, sidewalks, traffic lights, topographical features of the road, and so forth. In some instances, the roadgraph can include a map, such as a high definition (HD) map that represents one or more static features of the road. The roadgraph can include one or more AV driving paths.

An "autonomous vehicle (AV) driving path" (also referred to as "driving path" or "path" herein) can refer to a driving path of an AV through a particular scene. For example, the AV driving path between a small stretch of highway can include a driving path in the slow lane of the highway.

A "polyline" includes a line having one or more line segments, such as discrete straight-line segments. In some implementations, the line segments are connected to vertices (e.g., nodes) to form a polyline. A "poly line path" can refer to a path, such as an AV driving path, that is defined by a polyline.

FIG. 1 is a diagram illustrating components of an example autonomous vehicle (AV) 100 capable of using motion patterns for object classification and tracking, in accordance with some implementations of the disclosure. Autonomous vehicles can include motor vehicles (cars, trucks, buses, motorcycles, all-terrain vehicles, recreational vehicle, any specialized farming or construction vehicles, and the like), aircraft (planes, helicopters, drones, and the like), naval vehicles (ships, boats, yachts, submarines, and the like), or any other self-propelled vehicles (e.g., sidewalk delivery robotic vehicles) capable of being operated in a self-driving mode (without a human input or with a reduced human input).

Vehicles, such as those described herein, may be configured to operate in one or more different driving modes. For instance, in a manual driving mode, a driver may directly control acceleration, deceleration, and steering via inputs such as an accelerator pedal, a brake pedal, a steering wheel, etc. A vehicle may also operate in one or more autonomous driving modes including, for example, a semi or partially autonomous driving mode in which a person exercises some amount of direct or remote control over driving operations, or a fully autonomous driving mode in which the vehicle handles the driving operations without direct or remote control by a person. These vehicles may be known by different names including, for example, autonomously driven vehicles, self-driving vehicles, and so on.

As described herein, in a semi-autonomous or partially autonomous driving mode, even though the vehicle assists with one or more driving operations (e.g., steering, braking and/or accelerating to perform lane centering, adaptive cruise control, advanced driver assistance systems (ADAS), or emergency braking), the human driver is expected to be situationally aware of the vehicle's surroundings and supervise the assisted driving operations. Here, even though the vehicle may perform all driving tasks in certain situations, the human driver is expected to be responsible for taking control as needed.

Although, for brevity and conciseness, various systems and methods may be described below in conjunction with autonomous vehicles, similar techniques can be used in various driver assistance systems that do not rise to the level of fully autonomous driving systems. In the United States, the Society of Automotive Engineers (SAE) have defined different levels of automated driving operations to indicate how much, or how little, a vehicle controls the driving, although different organizations, in the United States or in other countries, may categorize the levels differently. More specifically, disclosed systems and methods can be used in SAE Level 2 driver assistance systems that implement steering, braking, acceleration, lane centering, adaptive cruise control, etc., as well as other driver support. The disclosed systems and methods can be used in SAE Level 3 driving assistance systems capable of autonomous driving under limited (e.g., highway) conditions. Likewise, the disclosed systems and methods can be used in vehicles that use SAE Level 4 self-driving systems that operate autonomously under most regular driving situations and require only occasional attention of the human operator. In all such driving assistance systems, accurate lane estimation can be performed automatically without a driver input or control (e.g., while the vehicle is in motion) and result in improved reliability of vehicle positioning and navigation and the overall safety of autonomous, semi-autonomous, and other driver assistance systems. As previously noted, in addition to the way in which SAE categorizes levels of automated driving operations, other organizations, in the United States or in other countries, may categorize levels of automated driving operations differently. Without limitation, the disclosed systems and methods herein can be used in driving assistance systems defined by these other organizations' levels of automated driving operations.

A driving environment 110 can include any objects (animated or non-animated) located outside the AV, such as roadways, buildings, trees, bushes, sidewalks, bridges, mountains, other vehicles, pedestrians, and so on. The driving environment 110 can be urban, suburban, rural, and so on. In some implementations, the driving environment 110 can be an off-road environment (e.g. farming or agricultural land). In some implementations, the driving environment can be an indoor environment, e.g., the environment of an industrial plant, a shipping warehouse, a hazardous area of a building, and so on. In some implementations, the driving environment 110 can be substantially flat, with various objects moving parallel to a surface (e.g., parallel to the surface of Earth). In other implementations, the driving environment can be three-dimensional and can include objects that are capable of moving along all three directions (e.g., balloons, leaves, etc.). Hereinafter, the term "driving environment" should be understood to include all environments in which an autonomous motion of self-propelled vehicles can occur. For example, "driving environment" can include any possible flying environment of an aircraft or a marine environment of a naval vessel. The objects of the driving environment 110 can be located at any distance from the AV, from close distances of several feet (or less) to several miles (or more).

The example AV 100 can include a sensing system 120. The sensing system 120 can include various electromagnetic (e.g., optical) and non-electromagnetic (e.g., acoustic) sensing subsystems and/or devices. The terms "optical" and "light," as referenced throughout this disclosure, are to be understood to encompass any electromagnetic radiation (waves) that can be used in object sensing to facilitate autonomous driving, e.g., distance sensing, velocity sensing, acceleration sensing, rotational motion sensing, and so on. For example, "optical" sensing can utilize a range of light visible to a human eye (e.g., the 380 to 700 nm wavelength range), the ultraviolet range (below 380 nm), the infrared range (above 700 nm), the radio frequency range (above 1 m), etc. In implementations, "optical" and "light" can include any other suitable range of the electromagnetic spectrum.

The sensing system 120 can include a radar unit 126, which can be any system that utilizes radio or microwave frequency signals to sense objects within the driving environment 110 of the AV 100. The radar unit can be configured to sense both the spatial locations of the objects (including their spatial dimensions) and their velocities (e.g., using the Doppler shift technology). Hereinafter, "velocity" refers to both how fast the object is moving (the speed of the object) as well as the direction of the object's motion.

The sensing system 120 can include one or more lidar sensors 122 (e.g., lidar rangefinders), which can be a laser-based unit capable of determining distances (e.g., using ToF technology) to the objects in the driving environment 110. The lidar sensor(s) can utilize wavelengths of electromagnetic waves that are shorter than the wavelength of the radio waves and can, therefore, provide a higher spatial resolution and sensitivity compared with the radar unit. The lidar sensor(s) can include a coherent lidar sensor, such as a frequency-modulated continuous-wave (FMCW) lidar sensor. The lidar sensor(s) can use optical heterodyne detection for velocity determination. In some implementations, the functionality of a ToF and coherent lidar sensor(s) is combined into a single (e.g., hybrid) unit capable of determining both the distance to and the radial velocity of the reflecting object. Such a hybrid unit can be configured to operate in an incoherent sensing mode (ToF mode) and/or a coherent sensing mode (e.g., a mode that uses heterodyne detection) or both modes at the same time. In some implementations, multiple lidar sensor(s) 122 units can be mounted on AV, e.g., at different locations separated in space, to provide additional information about a transverse component of the velocity of the reflecting object, as described in more detail below.

The lidar sensor(s) 122 can include one or more laser sources producing and emitting signals and one or more detectors of the signals reflected back from the objects. The lidar sensor(s) 122 can include spectral filters to filter out spurious electromagnetic waves having wavelengths (frequencies) that are different from the wavelengths (frequencies) of the emitted signals. In some implementations, the lidar sensor(s) 122 can include directional filters (e.g., apertures, diffraction gratings, and so on) to filter out electromagnetic waves that can arrive at the detectors along directions different from the retro-reflection directions for the emitted signals. The lidar sensor(s) 122 can use various other optical components (lenses, mirrors, gratings, optical films, interferometers, spectrometers, local oscillators, and the like) to enhance sensing capabilities of the sensors.

In some implementations, the lidar sensor(s) 122 can scan 360-degree in a horizontal direction. In some implementations, the lidar sensor(s) 122 can be capable of spatial scanning along both the horizontal and vertical directions. In some implementations, the field of view can be up to 90 degrees in the vertical direction (e.g., with at least a part of the region above the horizon being scanned by the lidar signals). In some implementations, the field of view can be a full sphere (consisting of two hemispheres). For brevity and conciseness, when a reference to "lidar technology," "lidar sensing," "lidar data," and "lidar," in general, is made in the disclosure, such reference shall be understood also to encompass other sensing technology that operate at generally in the near-infrared wavelength, but may include sensing technology that operate at other wavelengths.

The sensing system 120 can further include one or more cameras 129 to capture images of the driving environment 110. The images can be two-dimensional projections of the driving environment 110 (or parts of the driving environment 110) onto a projecting plane (flat or non-flat, e.g. fisheye) of the cameras. Some of the cameras 129 of the sensing system 120 can be video cameras configured to capture a continuous (or quasi-continuous) stream of images of the driving environment 110. The sensing system 120 can also include one or more sonars 128, which can be ultrasonic sonars, in some implementations.

The sensing data obtained by the sensing system 120 can be processed by a data processing system 130 of AV 100. For example, the data processing system 130 can include a perception system 132. The perception system 132 can be configured to detect and/or track objects in the driving environment 110 and to recognize the objects. For example, the perception system 132 can analyze images captured by the cameras 129 and can be capable of detecting traffic light signals, road signs, roadway layouts (e.g., boundaries of traffic lanes, topologies of intersections, designations of parking places, and so on), presence of obstacles, and the like. The perception system 132 can further receive the lidar sensing data (coherent Doppler data and incoherent ToF data) to determine distances to various objects in the environment 110 and velocities (radial and, in some implementations, transverse, as described below) of such objects. In some implementations, the perception system 132 can use the lidar data in combination with the data captured by the camera(s) 129. In one example, the camera(s) 129 can detect an image of a scene, such as a construction zone scene. Using the data from the camera(s) 129, lidar data, etc., the perception system 132 can be capable of determining the existence of objects within the scene (e.g., cones). For example, the perception system 132 can include a scene recognition component 133. The scene recognition component 133 can receive data from the sensing system 120, and can identify a scene (e.g., a construction zone scene) based on the data.

The perception system 132 can further receive information from a GPS transceiver (not shown) configured to obtain information about the position of the AV relative to Earth. The GPS data processing module 134 can use the GPS data in conjunction with the sensing data to help accurately determine location of the AV with respect to fixed objects of the driving environment 110, such as roadways, lane boundaries, intersections, sidewalks, crosswalks, road signs, surrounding buildings, and so on, locations of which can be provided by map information 135. In some implementations, the data processing system 130 can receive non-electromagnetic data, such as sonar data (e.g., ultrasonic sensor data), temperature sensor data, pressure sensor data, meteorological data (e.g., wind speed and direction, precipitation data), and the like.

The data processing system 130 can further include an environment monitoring and prediction component 136, which can monitor how the driving environment 110 evolves with time, e.g., by keeping track of the locations and velocities of the animated objects (relative to Earth). In some implementations, the environment monitoring and prediction component 136 can keep track of the changing appearance of the environment due to motion of the AV relative to the environment. In some implementations, the environment monitoring and prediction component 136 can make predictions about how various animated objects of the driving environment 110 will be positioned within a prediction time horizon. The predictions can be based on the current locations and velocities of the animated objects as well as on the tracked dynamics of the animated objects during a certain (e.g., predetermined) period of time. For example, based on stored data for object 1 indicating accelerated motion of object 1 during the previous 3-second period of time, the environment monitoring and prediction component 136 can conclude that object 1 is resuming its motion from a stop sign or a red traffic light signal. Accordingly, the environment monitoring and prediction component 136 can predict, given the layout of the roadway and presence of other vehicles, where object 1 is likely to be within the next 3 or 5 seconds of motion. As another example, based on stored data for object 2 indicating decelerated motion of object 2 during the previous 2-second period of time, the environment monitoring and prediction component 136 can conclude that object 2 is stopping at a stop sign or at a red traffic light signal. Accordingly, the environment monitoring and prediction component 136 can predict where object 2 is likely to be within the next 1 or 3 seconds. The environment monitoring and prediction component 136 can perform periodic checks of the accuracy of its predictions and modify the predictions based on new data obtained from the sensing system 120.

The data generated by the perception system 132 (i.e., perception data), the GPS data processing module 134, and the environment monitoring and prediction component 136, and a AV driving path trained model 142 (also referred to as "AV driving path trained machine learning model 142" herein), can be received by an autonomous driving system, such as AV control system (AVCS) 140. The AVCS 140 can include one or more algorithms that control how the AV is to behave in various driving situations and environments. The AV driving path trained model 142 is a model trained using AV driving path data, as described herein. The AV driving data can include AV driving paths (e.g., labels) generated using a path adjustment operation and/or include corresponding scene data (e.g., data depicting corresponding scenes, such as construction zone scenes) that is paired (e.g., features) with the corresponding AV driving paths, as further described herein.

For example, the AVCS 140 can include a navigation system for determining a global driving route to a destination point. The AVCS 140 can also include a driving path selection system for selecting a particular path through the immediate driving environment, which can include selecting a traffic lane, negotiating a traffic congestion, choosing a place to make a U-turn, selecting a trajectory for a parking maneuver, and so on. The AVCS 140 can also include an obstacle avoidance system for safe avoidance of various obstructions (cones, rocks, stalled vehicles, a jaywalking pedestrian, and so on) within the driving environment of the AV. The obstacle avoidance system can be configured to evaluate the size of the obstacles and the trajectories of the obstacles (if obstacles are animated) and select an optimal driving strategy (e.g., braking, steering, accelerating, etc.) for avoiding the obstacles.

Algorithms and modules of AVCS 140 can generate instructions for various systems and components of the vehicle, such as the powertrain and steering 150, vehicle electronics 160, signaling 170, and other systems and components not explicitly shown in FIG. 1. The powertrain and steering 150 can include an engine (internal combustion engine, electric engine, and so on), transmission, differentials, axles, wheels, steering mechanism, and other systems. The vehicle electronics 160 can include an on-board computer, engine management, ignition, communication systems, carputers, telematics, in-car entertainment systems, and other systems and components. The signaling 170 can include high and low headlights, stopping lights, turning and backing lights, horns and alarms, inside lighting system, dashboard notification system, passenger notification system, radio and wireless network transmission systems, and so on. Some of the instructions output by the AVCS 140 can be delivered directly to the powertrain and steering 150 (or signaling 170) whereas other instructions output by the AVCS 140 are first delivered to the vehicle electronics 160, which generate commands to the powertrain and steering 150 and/or signaling 170.

In one example, the AVCS 140 can determine that an obstacle identified by the data processing system 130 is to be avoided by decelerating the vehicle until a safe speed is reached, followed by steering the vehicle around the obstacle. The AVCS 140 can output instructions to the powertrain and steering 150 (directly or via the vehicle electronics 160) to 1) reduce, by modifying the throttle settings, a flow of fuel to the engine to decrease the engine rpm, 2) downshift, via an automatic transmission, the drivetrain into a lower gear, 3) engage a brake unit to reduce (while acting in concert with the engine and the transmission) the vehicle's speed until a safe speed is reached, and 4) perform, using a power steering mechanism, a steering maneuver until the obstacle is safely bypassed. Subsequently, the AVCS 140 can output instructions to the powertrain and steering 150 to resume the previous speed settings of the vehicle.

Figure 2:
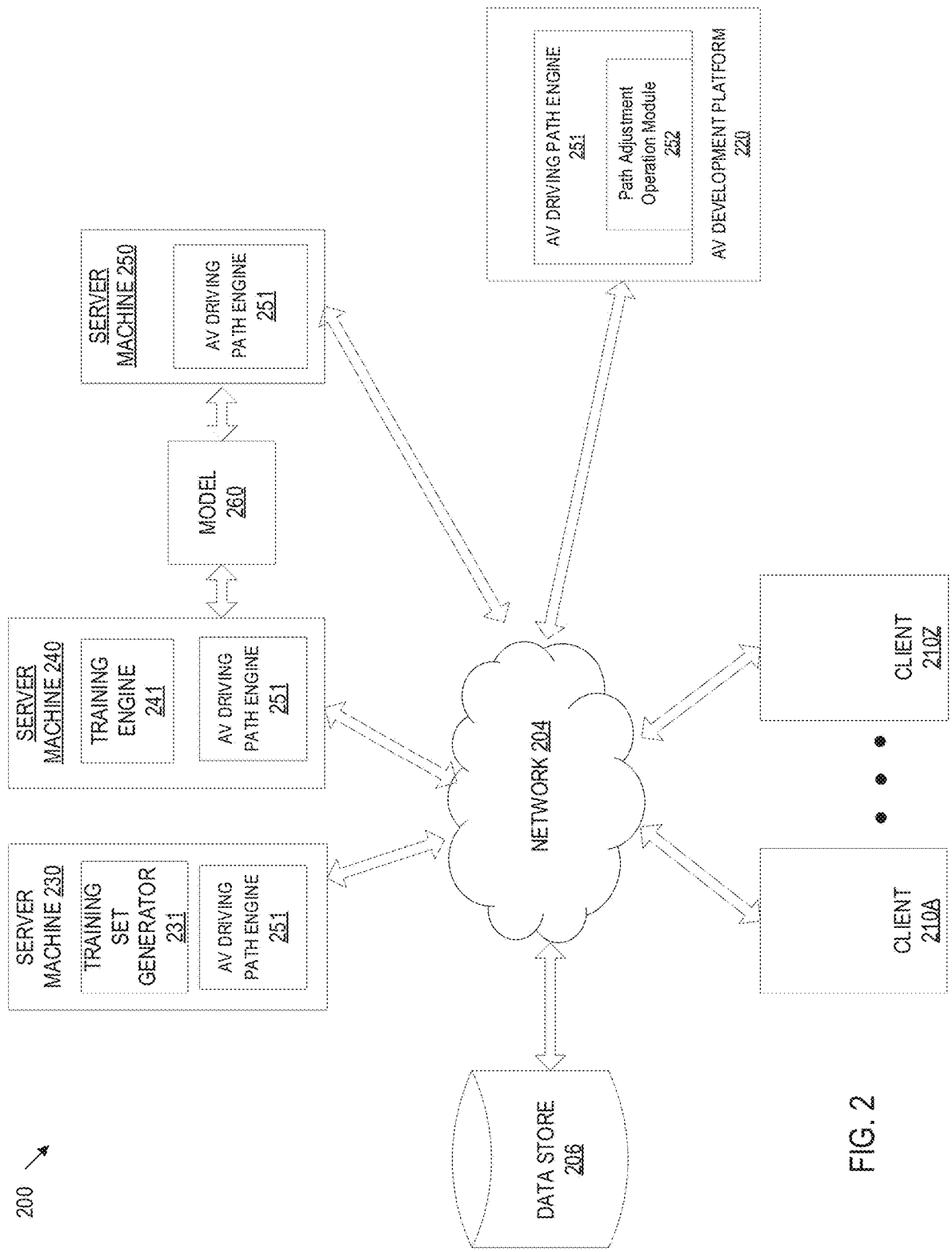
FIG. 2 illustrates an example system architecture associated with machine learning models, in accordance with some implementations of the disclosure.

FIG. 2 illustrates an example system architecture 200 associated with machine learning models, in accordance with some implementations of the disclosure. The system architecture 200 (also referred to as "system" herein) includes an AV development platform 220, one or more server machines 230 through 250, a data store 206, and client devices 210A-210Z connected to a network 204.

In implementations, network 204 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some implementations, data store 206 is a persistent storage that is capable of storing content items (generally referred to as "AV development information"), such as scene data, roadgraphs, and or AV training set data) as well as data structures to tag, organize, and index the content items. Data store 206 may be hosted by one or more storage devices, such as main memory, magnetic or optical storage based disks, tapes or hard drives, NAS, SAN, and so forth. In some implementations, data store 206 may be a network-attached file server, while in other implementations data store 206 may be some other type of persistent storage such as an object-oriented database, a relational database, and so forth, that may be hosted by AV development platform 220 or one or more different machines coupled to the AV development platform 220 via the network 204.

The client devices 210A-210Z may each include computing devices such as personal computers (PCs), laptops, mobile phones, smart phones, tablet computers, netbook computers, network-connected televisions, etc. In some implementations, client devices 210A through 210Z may also be referred to as "user devices."

In some implementations, the AV development platform 220 or server machines 230-250 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, or hardware components that may be used to provide a user with access to content items. For example, the AV development platform 220 may allow a user to process, modify, consume, upload, and search for AV development information. The AV development platform 220 may also include a website (e.g., a webpage) or application back-end software that may be used to provide a user with access to AV development information or services provided by the AV development platform 220.

In some implementations, a "user" may be represented as a single individual. However, other implementations of the disclosure encompass a "user" being an entity controlled by a set of users and/or an automated source. For example, a set of individual users federated as one or more departments in an organization may be considered a "user."

In some implementations, AV development platform 220 can be a third-party platform. In some implementations, the third-party AV development platform 220 is accessible, at least in part, by one or more users of an organization. For example, a third party can provide AV development services using the AV development platform 220 to one or more users of an organization. In implementations, the user may access AV development platform 220 through a user account. The user may access (e.g., log in to) the user account by providing user account information (e.g., username and password) via an application on client device 210. In some implementations, AV development platform 220 can store and host AV development information and provide access to the AV development information through client devices 210A-210Z. In some implementations, AV development platform 220 includes AV driving path engine 251. In some implementations, the AV driving path engine 251 can include a path adjustment module 252 (e.g., roadgraph solver) that can perform path adjustment operations, as described herein. In some implementations, AV driving path engine 251 hosted by AV development platform 220 can perform aspects of the disclosure. In some implementations, the AV driving path engine 251 (and/or path adjustment operation module 252) can be included in any element of FIG. 2, including but not limited to server machine 230, 240, and/or 250.

Server machine 230 includes a training set generator 231 that is capable of generating training data (e.g., a set of training inputs and a set of target outputs) to train a machine learning model. Some operations of training set generator 231 are described in detail below with respect to FIGS. 3B, 9 and 11.

Server machine 240 includes a training engine 241 that is capable of training a machine learning model 260 using the training data from training set generator 231. The machine learning model 260 may refer to the model artifact that is created by the training engine 241 using the training data that includes training inputs and corresponding target outputs (correct answers for respective training inputs). The training engine 241 may find patterns in the training data that map the training input to the target output (the answer to be predicted), and provide the machine learning model 260 that captures these patterns. The machine learning model 260 may be composed of, e.g., a single level of linear or non-linear operations (e.g., a deep sequential network, i.e., a machine learning model that is composed of multiple levels of non-linear operations. An example of a deep sequential network is a neural network with one or more hidden layers, and such machine learning model may be trained by, for example, adjusting weights of a neural network in accordance with a backpropagation learning algorithm or the like. For convenience, the remainder of this disclosure will refer to the implementation as a neural network, even though some implementations might employ other type of learning machine instead of, or in addition to, a neural network. In some implementations, the machine learning model is a supervised machine learning model that is trained using input-output pairs (e.g., scene data (features) paired with one or more AV driving paths (labels)) as input to train the machine learning model.

In some implementations, the training set is obtained from server machine 230. Server machine 250 includes an AV driving path engine 251 that provides scene data as input to trained machine learning model 260 and runs trained machine learning model 260 on the input to obtain one or more outputs. As described in detail below with respect to FIG. 12, in one implementation AV driving path engine 251 is also capable of identifying one or more AV driving paths from the output of the trained machine learning model 260 and extract confidence data from the output that indicates a level of confidence that one or more AV driving paths avoids the one or more obstacles, and use the confidence data to identify the AV driving path that the AV is to follow to avoid the obstacles of the construction zone.

In some implementations, confidence data may include or indicate a level of confidence of that one or more AV driving paths corresponds to a scene (e.g., scene data reflecting a construction zone scene including one or more obstacles). In one example, the level of confidence is a real number between 0 and 1 inclusive, where 0 indicates no confidence that AV driving path corresponds to scene data representing a scene and 1 indicates absolute confidence that the AV driving path corresponds to scene data representing the scene.

Also as noted above, for purpose of illustration, rather than limitation, aspects of the disclosure describe the training of a machine learning model and use of a trained machine learning model. In other implementations, a heuristic model or rule-based model can be used as an alternative. It should be noted that in some other implementations, one or more of the functions of server machines 230, 240, and 250 or AV development platform 220 may be provided by a fewer number of machines. For example, in some implementations server machines 230 and 240 may be integrated into a single machine, while in some other implementations one or more of server machines 230, 240, 250, or AV development platform 220 may be integrated into a single machine. In addition, in some implementations one or more of server machines 230, 240, or 250 may be integrated into the AV development platform 220.

In general, functions described in one implementation as being performed by the AV development platform 220, server machine 230, server machine 240, or server machine 250 can also be performed on the client devices 210A through 210Z in other implementations, if appropriate. In addition, the functionality attributed to a particular component can be performed by different or multiple components operating together. The AV development platform 220, server machine 230, server machine 240, or server machine 250 can also be accessed as a service provided to other systems or devices through appropriate application programming interfaces, and thus is not limited to use in websites.

Although implementations of the disclosure are discussed in terms of AV development platforms, implementations may also be generally applied to any type of platform or service.

In situations in which the systems discussed here collect personal information about users, or may make use of personal information, the users may be provided with an opportunity to control whether the AV development platform 220 collects user information (e.g., information about a user's HR information), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the AV development platform 220.

Figure 3A:
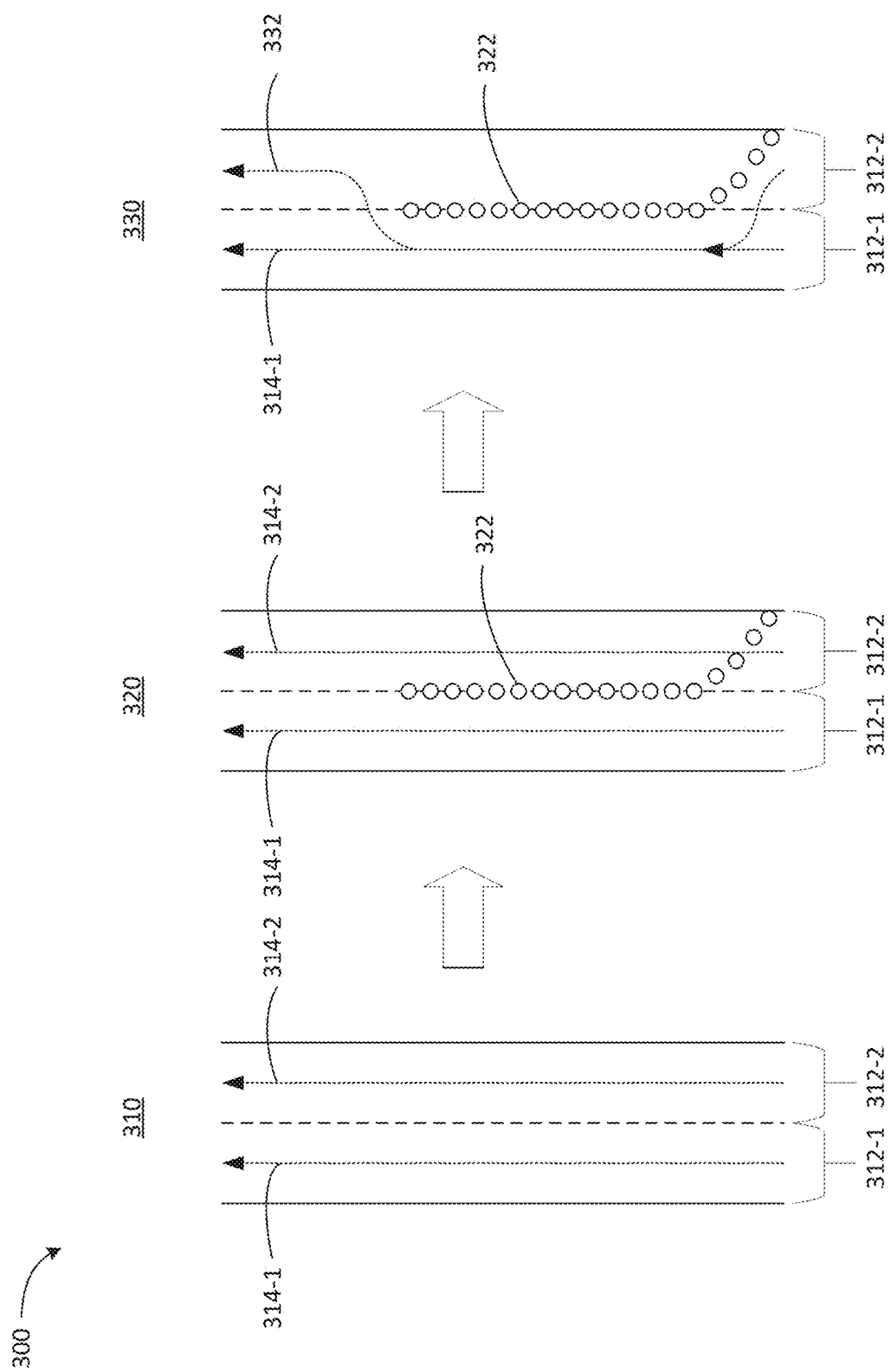
FIG. 3A depicts a diagram illustrating the conversion of an original roadgraph to a modified roadgraph including a final AV driving path, in accordance with some implementations of the disclosure.

FIG. 3A depicts a diagram 300 illustrating the conversion of an original roadgraph to a modified roadgraph including a final AV driving path, in accordance with some implementations of the disclosure. For example, the diagram 300 can reflect a construction zone scene. However, such an implementation should not be considered limiting.

As shown, the diagram 300 depicts an original roadgraph 310 having a first roadgraph lane 312-1 and a second roadgraph lane 312-2. A first initial (e.g., original) AV driving path 314-1 (e.g., first roadgraph path) illustrating a driving path of an AV driving within the first roadgraph lane 312-1 and a second initial AV driving path 314-2 (e.g., second roadgraph path) illustrating a driving path of an AV driving within the second roadgraph lane 312-2 are shown. For purposes of this illustrative example, the AV driving paths 314-1 and 314-2 are proceeding in the same direction to simulate that traffic should be moving in the same direction within each of the roadgraph lanes 312-1 and 312-2. However, in other implementations, one of the AV driving paths 314-1 or 314-2 can proceed in an opposite direction to simulate that traffic should be moving in an opposite direction.

The diagram 300 further depicts the roadgraph 320 (e.g., illustrating modifications to roadgraph 310) with defined objects of a construction zone scene (e.g., scene semantics and an object configuration). A number of obstacles 322 are represented in roadgraph 320 to define a construction zone within the scene. For example, obstacles 322 can represent a number of cones placed along the boundary of a construction zone. Initial AV driving path 314-2 is illustrated obstructed by the obstacles 322 of the construction zone.

The diagram 300 further depicts roadgraph 330 depicting the modified roadgraph 320 and an updated AV driving path 332 (e.g., final AV driving path) that avoids the objects 322 of the construction zone. For example, the corresponding portion of the initial AV driving path 314-2 from the original roadgraph 310 is shifted and merged into the initial AV driving path 314-1 to generate a updated AV driving path 332 (e.g., final AV driving path) that avoids the obstacles 322 of the construction zone.

In some implementations, the original roadgraph itself may not be designed to be modifiable. In order to modify the original roadgraph, the original roadgraph can be represented by a mutable version of the original roadgraph, or mutable roadgraph. A mutable roadgraph is a data structure that, at a high level, represents a graph of AV driving paths. New AV driving paths can be attached to spots on the existing graph; existing AV driving paths can be disabled, etc. A building block of a mutable roadgraph is referred to as an abstract AV driving path. An abstract AV driving path is a data structure that defines a one-dimensional (1D) space, and stores properties of a construction zone at various locations of the roadgraph (e.g., using offsets from any suitable reference location). Examples of such properties include, but are not limited to, AV driving path center location, AV driving path heading, distance to left/right boundaries, speed limit, drivability, etc. The abstract AV driving path data structure can have a number of derived classes. One derived class is referred to as "roadgraph path" and represents unchanged AV driving paths (e.g., initial AV driving path) in the original roadgraph. AV driving path properties can be derived from the original roadgraph. Another derived class is referred to as "updated path" and represents updated AV driving paths that avoid obstacles of a construction zone.

Figure 3B:
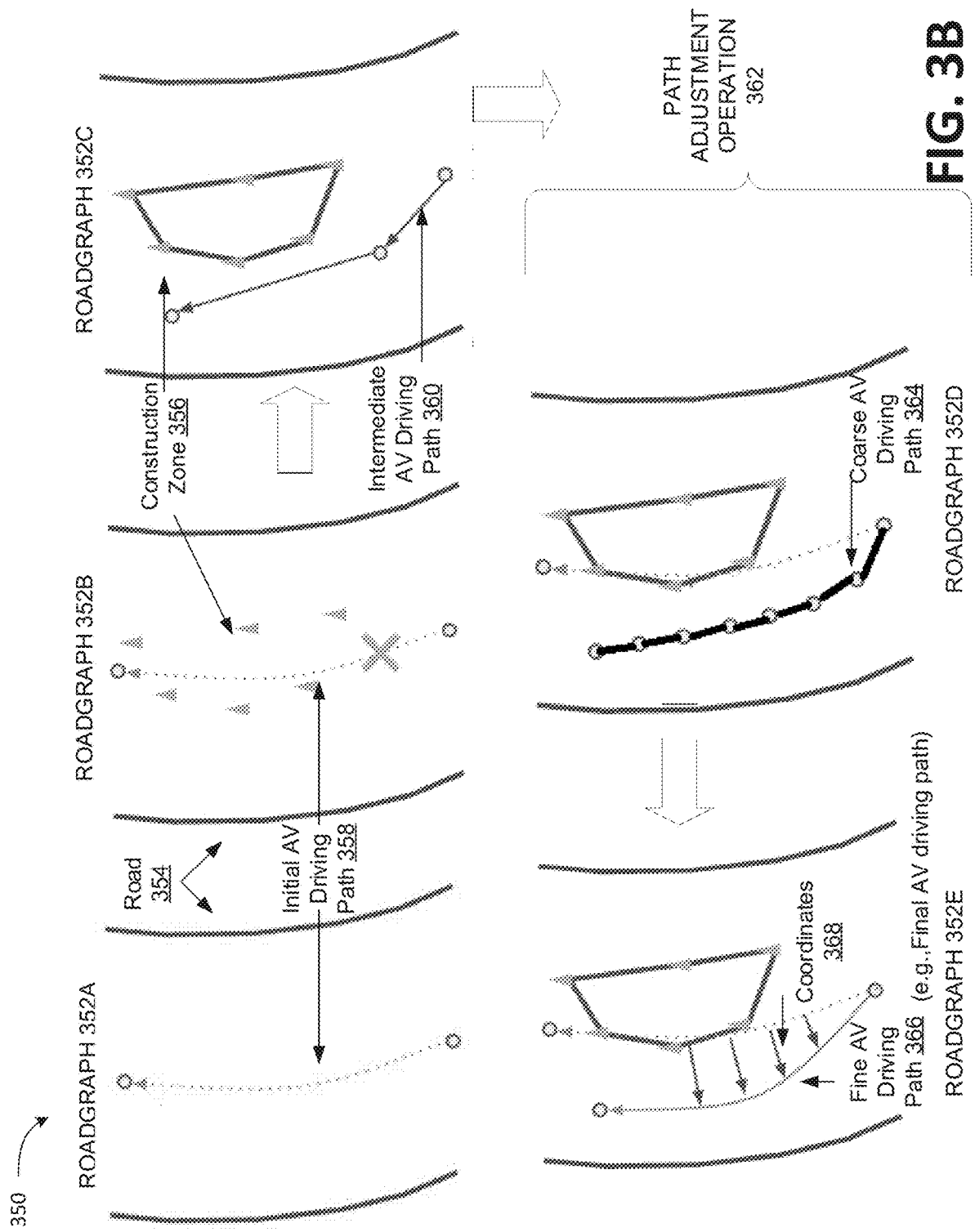
FIG. 3B depicts a diagram illustrating the generation of machine learning model labels including final AV driving paths, in accordance with some implementations of the disclosure.

FIG. 3B depicts a diagram 350 illustrating the generation of machine learning model labels including final AV driving paths, in accordance with some implementations of the disclosure. In some implementations, the operations described with respect to FIG. 3B can be performed by AV driving path engine 251, and more specifically, path adjustment operation module 252 of FIG. 2.

Diagram 300 illustrates roadgraph 352A, roadgraph 352B, roadgraph 352C, roadgraph 352D, and roadgraph 352E (generally referred to as "roadgraphs 352" herein). Roadgraphs 352 include a road 354 illustrated by the outer parallel solid lines. Roadgraphs 352B through 352E illustrate a construction zone 356 that includes one or more obstacles, such as cones (denoted by triangles) and other obstacles (denoted by an "X"). In some of the roadgraphs 352, the perimeter or boundary of the construction zone 356 is denoted by solid lines.

Roadgraph 352A (also referred to as "initial roadgraph" herein) includes the initial AV driving path 358 (e.g., original AV driving path) with an initial scene where no obstacles of a construction zone 356 are present on road 354. The initial AV driving path 358 is illustrated in dashed lines in roadgraph 352A, roadgraph 352B, roadgraph 352D and roadgraph 352E. It can be noted that the initial AV driving path 358 can be included in roadgraph 352C in implementations, and is not included for purposes of image clarity.

Roadgraph 352C illustrates an intermediate AV driving path 360 that reflects modifications to the initial AV driving path 358 to avoid the obstacles of the construction zone 356 that are obstructing the initial AV driving path 358. In some implementations, the intermediate AV driving path 360 is a polyline path that includes one or more line segments (two are illustrated) that are connected to vertices (illustrated with circles). In some implementations, the line segments of the polyline are straight lines. In some implementations, the roadgraph 352 can be associated with a coordinate system, such as a 2-dimensional or 3-dimensional coordinate system, and the intermediate AV driving path 360 can be determined using the coordinate system. For example, the graph can have vertices and the intermediate AV driving path 360 can be a connection of line segments to the vertices.

In some implementations, the intermediate AV driving path 360 can include a coarse approximation (e.g., low resolution) of an AV driving path that avoids the obstacles of the construction zone 356. For example, the distance between adjacent vertices can be three or more meters from one another.

In some implementations, the intermediate AV driving path 360 can be a human-created intermediate AV driving path 360. For example, a human operator can view, via a graphical user interface (GUI) of a computer, the roadgraph 352C with a coordinate system (e.g., 2-dimensional graph) overlaid and connect the vertices with line segments to generate the intermediate AV driving path 360 that avoids the obstacles of the construction zone 356. In some implementations, the intermediate AV driving path 360 can be computer-generated intermediate AV driving path 360. For example, a software application can create and/or generate the intermediate AV driving path 360 based on a set of rules.

In some implementations, roadgraph 352C or at least the intermediate AV driving path 360 of the roadgraph 352C can be provided as input data to the path adjustment operation 362. The path adjustment operation 362 can identify one or more candidate AV driving paths based on the intermediate AV driving path 360 and determine a cost value for each of the one or more candidate AV driving paths. For example, the path adjustment operation 362 can implement a cost function with one or more cost terms to evaluate the one or more candidate AV driving paths (or segments thereof). Each of the one or more candidate AV driving path can correspond to a cost value and a candidate AV driving path (e.g., fine AV driving path 366) having a cost value that satisfies an evaluation criterion (e.g., an optimal cost value, such as a lowest cost value) among the one or more candidate AV driving paths can be selected.

In some implementations, a single candidate AV driving path is identified. For example, the path adjustment operation 362 can perform iterative loops to identify a candidate AV driving path having a cost value that satisfies an evaluation criterion (e.g., an optimal cost value, such as a lowest cost value). In another example, segments of a path can be evaluated in view of a cost function such that a cost value for each segment is determined. A candidate AV driving path can be determined by a collection of segments that have an aggregate cost value that satisfies an evaluation criterion (e.g., an optimal cost value, such as a lowest cost value). Additional details of the path adjustment operation 362 and cost functions are described at least with respect to FIG. 5-9.

In some implementations, the path adjustment operation 362 can have one or more stages, such as a coarse adjustment operation and a fine adjustment operation, as illustrated. Roadgraph 352D and roadgraph 352E can illustrate outputs of different stages of the path adjustment operation 362. In some implementations, the stages of the path adjustment operation 362 can be performed serially. For example, the coarse adjustment operation can be a first stage and produce an output such as roadgraph 352D (or at least coarse AV driving path 364). The output of the coarse AV driving path 364 can be used as input to the subsequent stage (e.g., fine adjustment operation) to produce an output such as roadgraph 352E (or at least fine AV driving path 366).

In some implementations, roadgraph 352E (also referred to as "final roadgraph 352E" herein) includes the fine AV driving path 366 (also referred to as "final AV driving path" herein) and coordinates 368. Coordinates 368 can identify the coordinates with respect to the initial AV driving path 358 that define the fine AV driving path 366. For example, the coordinates 368 can include vector values that define the fine AV driving path 366 with respect to the original coordinates of the initial AV driving path 358. In some implementations, the fine AV driving path (and/or coarse AV driving path 364) can include or be associated with coordinate data, such as coordinates 368).

In some implementations, the coarse AV driving path 364 can include a polyline path. In some implementations, the polyline path of the coarse AV driving path 364 can have greater granularity (e.g., greater resolution) than intermediate AV driving path 360. For example, as noted above the distance between adjacent vertices of the intermediate AV driving path 360 can be three or more meters. The distance between adjacent vertices of the coarse AV driving path 364 can be less than one meter.

In some implementations, the fine AV driving path 366 can include a continuous curved path with one or more continuous curvatures (rather than a polyline with discrete straight-line segments). In some implementations, roadgraph 352E, and specifically fine AV driving path 366 and/or coordinates 368 can be used as machine learning model labels (e.g., target output), as described herein. In some implementations, the final AV driving path includes a path shift with respect to the initial AV driving path 358 (e.g., deviates from the initial AV driving path 358). In some implementations, the final AV driving path includes a path merge into another autonomous vehicle driving path of the roadgraph (e.g., as illustrated in FIG. 3A).

In some implementations, the path adjustment operation 362 identifies one or more candidate AV driving paths that avoid the one or more obstacles of the construction zone 356 based on one or more cost terms (e.g., parameters and/or values of a cost function). The one or more cost terms can encourage or discourage particular path configurations by respectively lowering or raising (e.g., penalizing) the cost of particular path characteristics, such that a cost value associated with a particular candidate AV driving path reflects the aggregate cost of the path characteristics of the AV driving path.

For example, and in some implementations, the one or more cost terms can encourage the one or more candidate AV driving paths to stay close to the intermediate AV driving path 360. In some implementations, the one or more cost terms include a lane cost term that discourages the one or more candidate AV driving paths to deviate from an initial lane (e.g., the lane in which the AV is traveling prior to the obstacles). In some implementations, the one or more cost terms can include a smooth path cost term that encourages one or more candidate AV paths to be smooth (e.g., property measured by the number of continuous derivatives over some domain). In some implementations, the one or more cost terms can include an obstacle cost term that forbids (e.g., cost is infinite) the one or more candidate AV driving paths to hit the one or more obstacles. Cost terms are further described at least with respect to FIG. 5-6.

As noted above, the fine AV driving path 366 is the final AV driving path that can be used as a target output (e.g., label) for the set of training data of a machine learning model. The particular scene data of the scene (e.g., construction zone 356) can be used as training input (e.g., feature) of the set of training data that is paired with the target output. The set of training data can be provided to a machine learning model to train the machine learning model.

FIGS. 4A-4D illustrate diagrams 400A-400D showing multiple final AV driving paths that avoid obstacles of a construction zone and are generated using a path adjustment operation, in accordance with some implementations of the present disclosure. In some implementations, the generation of final AV driving paths associated with a roadgraph that includes a construction zone, can be generated by AV driving path engine 251, and in particular path adjustment module 252 of FIG. 2.

Figure 4B:
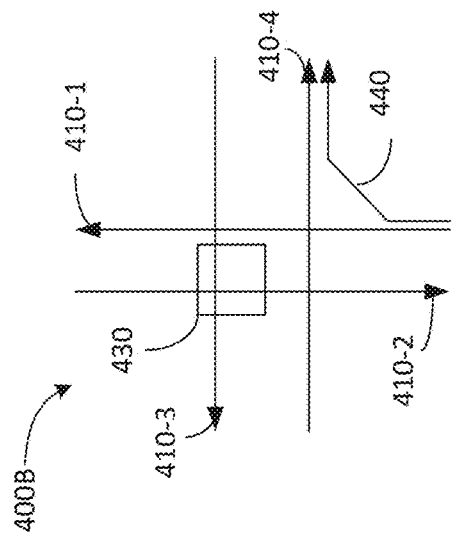
FIGS. 4A-4D illustrate diagrams showing multiple final AV driving paths that avoid obstacles of a construction zone and are generated using a path adjustment operation, in accordance with some implementations of the present disclosure.
Figure 4D:
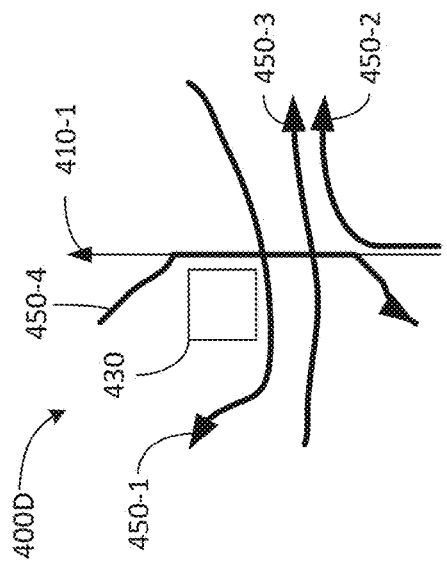
Figure 4A:
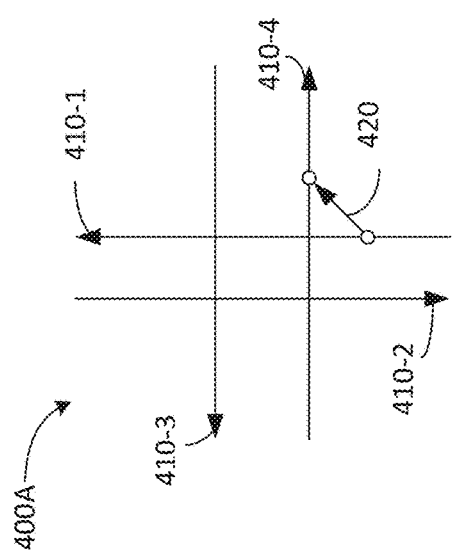

In FIG. 4A, diagram 400A is shown including initial AV driving paths 410-1 through 410-4. An additional initial AV driving path 420 (e.g., a short-cut road, line-turn lane, a ramp, etc.) is shown connecting initial AV driving path 410-1 and AV driving path 410-4. In some implementations, diagram 400A corresponds to an initial roadgraph, such as roadgraph 352A of FIG. 3B.

In FIG. 4B, diagram 400B is shown including a construction zone 430 and an AV driving path 440 (e.g., a right turn to a parallel road, a detour road, a bypass road, etc.). The construction zone 430 can include one or more obstacles affecting the initial AV driving paths of the initial roadgraph.

Figure 4C:
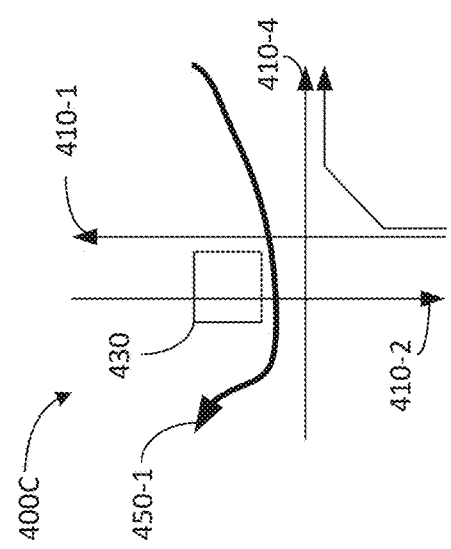

In FIG. 4C, a path adjustment operation is initiated to identify at least one candidate AV driving path that corresponds to initial AV driving path 410-3 that avoids the construction zone 430. For example, the initial AV driving path 410-3 of the initial roadgraph is modified in view of the construction zone 430 to produce a final AV driving path 450-1 that avoids the construction zone 430.

In FIG. 4D, in addition to final AV driving path 450-1, new final AV driving paths 450-2 through 450-4 are generated (using the path adjustment operation 362) to replace affected initial AV driving paths 410-2 and 410-4 (e.g., by deforming the initial AV driving paths 410-2 and 410-4 to be close to intermediate driving paths (not shown)). Final AV path 450-4 merges into initial AV driving path 410-1.

Figure 5:
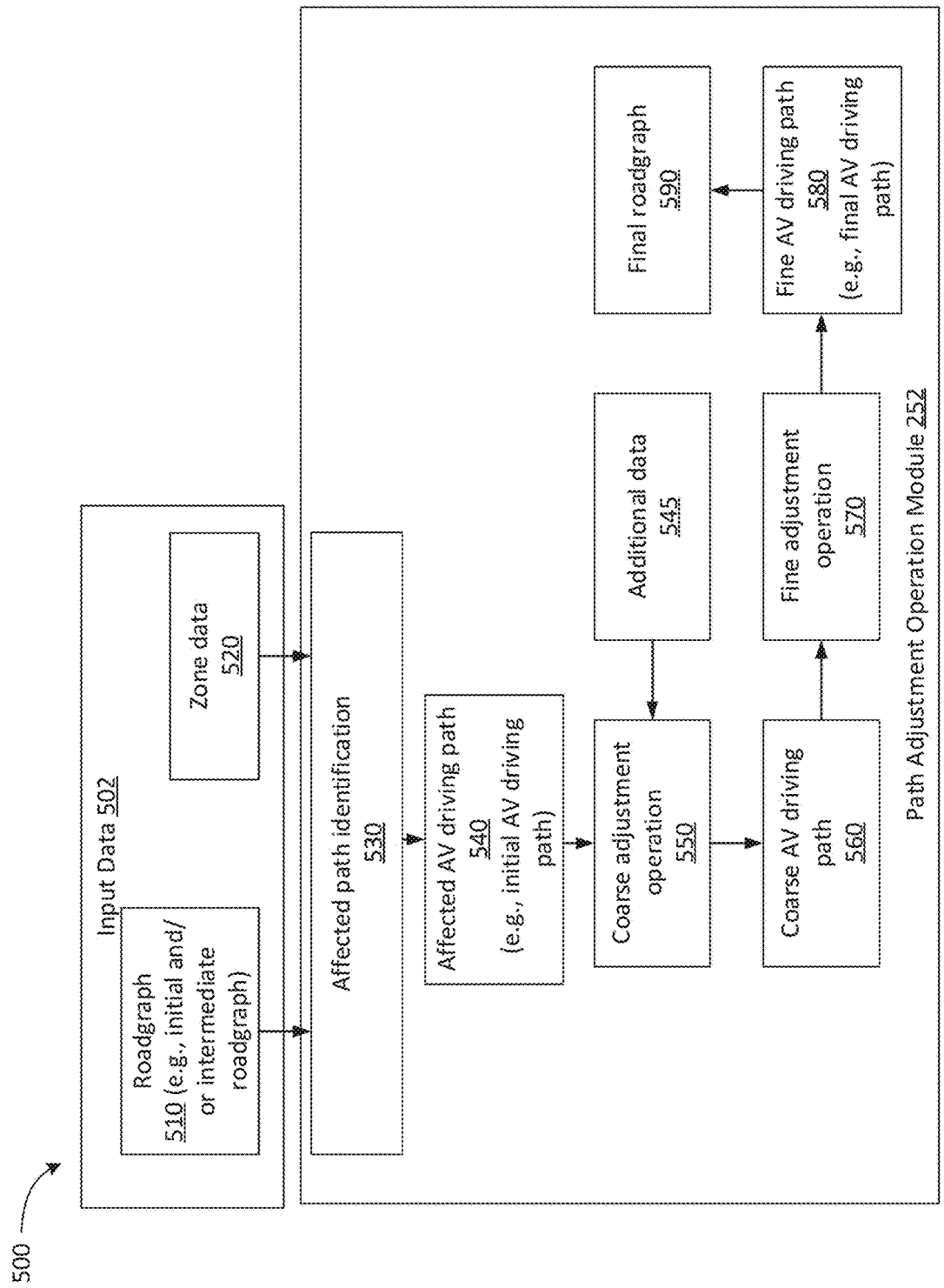
FIG. 5 is a diagram illustrating an example system for implementing a path adjustment operation, in accordance with some implementations of the disclosure.

FIG. 5 is a diagram illustrating an example system 500 for implementing a path adjustment operation, in accordance with some implementations of the disclosure. The system 500 can be implemented with AV driving path engine 251, and in particular path adjustment operation module 252 of FIG. 2. AV driving path engine 251, and in particular path adjustment operation module 252 can include the various components as illustrated in FIG. 5.

In some implementations, the path adjustment operation module 252 can be used to generate final AV driving paths in view of a set of input data 502 (also referred to as "input data" herein). For example, the path adjustment operation module 252 can receive information such as one or more roadgraphs 510 (roads, lanes, initial AV driving path, and/or intermediate AV driving path) or zone data 520 (e.g., data identifying one or more construction zones and/or one or more non-construction zones). For example, the path adjustment operation module 252 can solve for a final roadgraph (e.g., by deforming or modifying an initial roadgraph to avoid obstacles of the construction zone). Any suitable method can be implemented by the path adjustment operation module 252 to generate the final AV driving path of the final roadgraph, in accordance with the implementations described herein.

In some implementations, the input data 502 can include one or more of roadgraphs 510 and/or zone data 520. In some implementations, the roadgraphs 510 can include one or more of the initial roadgraph and the intermediate roadgraph (or parts thereof, such as an initial AV driving path and intermediate AV driving path, respectively), as illustrated in FIG. 3B. In some implementations, the roadgraphs 510 include mutable roadgraphs that can be modified. In some implementations, the zone data 520 can include information identifying one or more zones of the scene. In some implementations, the zone data 520 can be part of the roadgraphs 510.

In some implementations, the path adjustment operation module 252 can include an affected AV driving path identification component 530. An affected AV driving path can refer to an AV driving path, and in particular an initial AV driving path that is obstructed by obstacles of a construction zone. In some implementations, the affected AV driving path identification component 530 can identify an affected region of a roadgraph in view of the zone data 520 (e.g., identify a construction zone), and identify at least one affected AV driving path ("affected AV driving path") 540 of the roadgraph 510 in view of the zone data 520. In some implementations, the affected AV driving path 540 (e.g., initial AV driving path 358 of FIG. 3B) can be identified based on a minimum distance to the affected region.

In some implementations, the path adjustment operation can include one or more stages. In some implementations, the path adjustment operation can include two stages. In some implementations, a two-stage path adjustment operation can be performed based on the affected AV driving path 540 to find a final AV driving path that evades obstacles of a construction zone. In some implementations, the two-stage path adjustment operation can implement reinforcement learning to find a final AV driving path (e.g., optimal path) that will evade obstacles (e.g., zones, road steps), attempt to stay close to an intermediate AV driving path, be smooth, among others cost terms.

For example, as shown, the affected AV driving path 540 can be received by a coarse adjustment operation component 550. The coarse adjustment operation component 550 can perform coarse adjustment operation to generate at least one coarse AV driving path 560 ("coarse-optimized path") from the affected AV driving path 540. In some implementations, the goal of the coarse adjustment operation is to provide an AV driving path that is suitable for fine optimization, as will be described in further detail below. Additional data 545 can be received by the coarse adjustment operation component 550. The additional data 545 can include additional roadgraph modification information (e.g., additional zone data 520). Examples of data that can be included in additional data 545 include, but are not limited to, data identifying where to place AV driving path closures, data identifying which direction to shift the AV driving path, data identifying where to place a multi-lane shift, etc. In some implementations, the additional data 545 can include human-generated guidances (e.g., human adjustments to the AV driving path via a GUI that allows a human to adjust the AV driving path). In some implementations, the human guidances could be coarse & incomplete polylines indicating correct driving paths (e.g., intermediate AV driving path).

In some implementations, a dynamic programming method can be used by the coarse adjustment operation component 550 to perform the coarse adjustment operation. In some implementations, the path adjustment operation can implement a dynamic programming method. Further details regarding the operation of the coarse adjustment operation component 550 is described below with reference to FIG. 6.

In some implementations, the coarse AV driving path 560 is received by a fine adjustment optimization component 570 to "smooth out" the coarse AV driving path 560 and obtain at least one fine AV driving path 580. In some implementations, the fine AV driving path 580 can include the final AV driving path, as described herein. In some implementations, the fine AV driving path 580 can be generated by simulating how a vehicle would navigate in a real-world environment. In some implementations, each fine AV driving path, along with the unaffected AV driving paths (e.g., 410-1 of FIG. 4F) of the roadgraph 510, are stitched together to form final roadgraph 590. Further details regarding the coarse AV driving path 560 and the fine AV driving path 780 will be described in further detail below with reference to FIG. 7.

In some implementations, the fine adjustment optimization component 570 can generate the fine AV driving path 580 by implementing one or more cost functions. In some implementations, the fine adjustment optimization component 570 implements a Linear Quadratic Regulator (LQR). For example, the LQR can be an iterative LQR (iLQR). Cost terms that can be included in the cost function and include, but are not limited to, strict repellers from obstacles (e.g., zones and/or steps), attractors to stay close to the one or more AV driving paths of roadgraph 510 and to reach the destination, and constraints on physical states (e.g., speed, acceleration). In some implementations, the cost terms can include parameters and/or weights. In some implementations, parameters and weights of the cost terms can be found by inverse reinforcement learning from real vehicle trajectories. For example, inverse reinforcement learning can search for the best set of parameters, such that when constraining the iLQR with the cost function, the resulting final AV driving path most closely resemble the real vehicle driving paths. Further details regarding the operation of the fine adjustment optimization component 570 will be described in further detail below with reference to FIG. 8.

FIG. 6 is a diagram 600 illustrating an example of a coarse adjustment operation performed to obtain at least one coarse AV driving path, in accordance with some implementations of the disclosure. For example, the coarse adjustment operation can be performed by the coarse adjustment operation component 550 of FIG. 5.

The diagram 600 shows an initial AV driving path 610 that is affected by the obstacles of construction zone 620. In some implementations, coarse adjustment operation will be performed to identify a coarse AV driving path 650 that can replace the initial AV driving path 610. In some implementations, the coarse adjustment operation can implement: (1) a search space, (2) a cost function, and (3) a coarse adjustment method.

In some implementations, the search space including a discrete graph (e.g., graph having a grid) can be defined. In some implementations, the graph can have two dimensions: vertices—such as nodes, and steps—that can be a connection of multiple vertices using a straight line. For example, as shown, a number of steps (e.g., six steps are illustrated) including step 630 and a number of vertices including vertex 640 are defined. In some implementations, each coarse AV driving path 650 in the search space can intersect one vertex at each step, sequentially from the first step to the last step. In some implementations, the AV driving path geometry can include a polyline connecting the vertices at each pair of adjacent steps.

In some implementations, with respect to a cost function, the goal of the coarse adjustment operation can be to find at least one candidate path in the search space based on cost terms. For example, the coarse adjustment operation can find a candidate AV driving path that is at least one of short, smooth, avoids non-drivable regions (e.g., curbs, construction zones), stays close to the intermediate AV driving path 660, and has the same start and end point as the initial AV driving path 610. In some implementations, the cost function can be based on a sum of the length of each polyline segment in the AV driving path, and the sum of the cost at each vertex. For example, if a vertex falls inside of a non-drivable region, the cost associated with the vertex is infinite. For example, for the start and end point, any vertex other than that corresponding to the initial AV driving path 610 is associated with an infinite cost. At each step, the cost can increase as the distance between a vertex and the intermediate AV driving path 660 increases.

In some implementations, regarding the coarse adjustment method, given the search space and the cost function, the coarse adjustment method is used to find at least one candidate AV driving path (e.g., coarse AV driving path and/or fine AV driving path) with the lowest cost. For example, the candidate AV driving path can be the cheapest AV driving path that passes through one vertex per step, and is connected at the start point and at the end point of the initial AV driving path 610.

In some implementations, the coarse adjustment method can be implemented with dynamic programming. Dynamic programming can include an algorithmic technique for solving an optimization problem by breaking it down into simpler subproblems and utilizing the fact that the optimal solution to the overall problem depends upon the optimal solution to its subproblems. For example, a dynamic programming method can be employed by filling a state value matrix (e.g., cost function) based on the following equation (or similar equation using different cost terms):

$$\text{state}_{value}(i,j) = \text{state}_{cost}(i,j) + \min_k \{\text{action}_{cost}(i,j,k) + \text{state}_{value}(i+1,k)\}$$

where i corresponds to a current step, j corresponds to a vertex at the current step i, k corresponds to a vertex at a subsequent step i+1, $\text{state}_{value}(i, j)$ corresponds to the minimum cost for an AV driving path starting from vertex/at step i, $\text{state}_{cost}(i, j)$ corresponds to the cost for being at vertex j at step i, $\text{action}_{cost}(i, j, k)$ corresponds to the cost for moving from vertex j to vertex k, $\text{state}_{value}(i+1, k)$ corresponds to the minimum cost for an AV driving path starting from vertex k at step i+1, and $\min_k ( )$ minimizes over k. Since the value at step i depends on step i+1, the state value matrix can be filled backward starting from the last step. The state value matrix records the best vertex to go for the next step. The dynamic programming method can be used to select the cheapest path by taking the best move of each step from the beginning (i.e., by obtaining the recorded best vertices). In this example, the cheapest path is identified as coarse AV driving path 650. It can be noted that each state parameter can represent a cost term, in some implementations.

One example of a cost term that can be optimized is a "reaching goal" cost term. The corresponding cost punishes a distance between the last point of the candidate AV driving path to the goal location. The cost can be proportional to the square of the distance, for example.

Another example of a cost term that can be optimized is a "follow path" cost term (e.g., follow intermediate AV driving path cost term). The corresponding cost penalizes (e.g., increases the cost) a deviation of a candidate path from the intermediate AV driving path 660 (e.g., encourages the candidate AV driving path to stay close to intermediate AV driving path 660). The cost can be proportional to a sum of the minimal square distances from each point on the candidate AV driving path to the intermediate AV driving path 660.

Another example of a cost term is an "obstacle" cost term. The corresponding cost strictly punishes (e.g., forbids) the candidate AV driving path when the candidate AV driving path hits a non-drivable region (e.g., curb, obstacle of the construction zone). In some implementations, the cost can be proportional to a sum of cost terms for each point on the candidate AV driving path. For example, if a point is outside a non-drivable region by a constant margin (e.g., 2.0 meters), the corresponding cost term can be 0. Otherwise, the cost term can increase as a function of how deep inside the point is within the non-drivable region. For example, the cost term can increase as a square of the signed distance between the point and the polygon defining the non-drivable region (i.e. the cost term can increase quadratically).

Another example of a cost term is a "smooth path" cost term, which constrains the physical states of the candidate AV driving path (so the candidate AV driving path is reasonable for an AV to drive along). For example, the curvature of the path can be constrained to be small enough so that the AV can handle turns, acceleration will be sufficiently gentle so there is no handbrake use and/or impossible acceleration, etc.

Another example of a cost term is a "lane" cost term that discourages the one or more AV driving path deviating from the initial lane (e.g., the lane in with the initial AV driving path 610 is located).

FIG. 7 is a diagram 700 illustrating a coarse AV driving path and a fine AV driving path, in accordance with some implementations of the disclosure. The element 710 includes a coarse AV driving path 714 that avoids an obstacle 712. The coarse AV driving path 714 can be formed from a number of discrete line segments that traverse about the obstacle 712. An outline of an initial AV driving path 715 through the obstacle 712 is also shown. The diagram 700 further includes element 720 showing fine AV driving path 724 formed from a continuous curved line (e.g., continuous curves) that traverses around the obstacle 712.

FIGS. 8A-8C are diagrams 800A-800C illustrating an example of path adjustment operation performed to obtain at least one fine AV driving path, in accordance with some implementations of the disclosure.

For example, the diagrams 800A-800C can represent respective iterations of an iLQR method performed by the fine adjustment optimization component 570 of FIG. 5. As will be described, the path adjustment operation can be performed in a rolling manner to enable a fixed time horizon regardless of length of the candidate AV driving path, thereby improving AV driving path stability. Each subsequent iteration can be performed to improve a cost function associated with the candidate AV driving path.

In FIG. 8A, the diagram 800A shows a coarse AV driving path 810) having a start point 812 and an end point or goal 814. A first iteration of the iLQR method is performed to obtain a first intermediate path segment 820 having the start point 812 and an end point 822 corresponding to a first intermediate path segment target in view of the cost function.

In FIG. 8B, the diagram 800B shows a second iteration of the iLQR method that is performed to obtain a second intermediate path segment 830 having a start point at some progression along the first intermediate path segment 820, and an end point 832 corresponding to a second intermediate path segment in view of the cost function. The second intermediate path segment 830 can be generated from a given distance along the first intermediate path segment 820. For example, the given distance can be expressed as a percentage progression along the first intermediate path segment 820.

In FIG. 8C, the diagram 800C shows a final iteration of the iLQR method that is performed to obtain a fine AV driving path 840 in view of the cost function. The fine AV driving path 840 starts from the start point 812 and ends at the end point or goal 822. Any suitable number of additional iterations of the iLQR method (not shown) can be performed between the second iteration and the final iteration to achieve the fine AV driving path 840.

Figure 9:
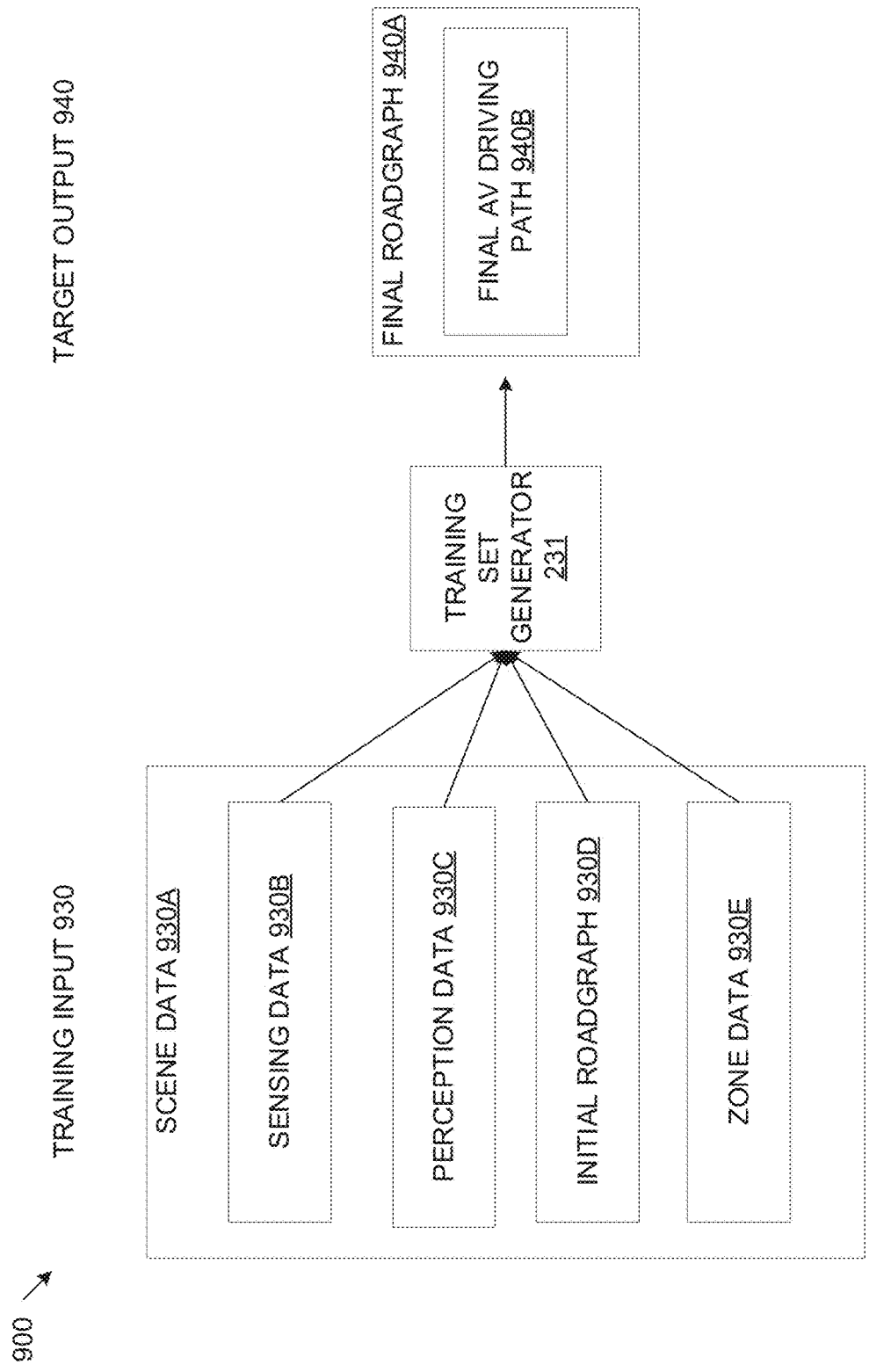
FIG. 9 is an example training set generator to create training data for a machine learning model using information pertaining to AV driving paths, in accordance with some implementations of the disclosure.

FIG. 9 is an example training set generator to create training data for a machine learning model using information pertaining to AV driving paths, in accordance with some implementations of the disclosure. System 900 shows training set generator 231, training inputs 930, and target outputs 940. System 900 may include similar components as system 200, as described with respect to FIG. 2. Components described with respect to system 200 of FIG. 2 may be used to help describe system 900 of FIG. 9.

In implementations, training set generator 231 generates training data that includes one or more training inputs 930, and one or more target outputs 940. The training data may also include mapping data that maps the training inputs 930 to the target outputs 940. Training inputs 930 may also be referred to as "features," "attributes," or "information." Training outputs 940 may also be referred to as "labels." In some implementations, training set generator 131 may provide the training data in a training set, and provide the training set to the training engine 141 where the training set is used to train the machine learning model 260.

In some implementations, training inputs 930 may include scene data 930A. Scene data 930A can include one or more of sensing data 930B, perception data 930C, initial roadgraph 930D (an in particular, initial AV driving path), and zone data 930E.

In some implementations, scene data 930A (as noted above) can include information that electronically (e.g., digital and/or analog data) represents a scene. In some implementations, the sensing data 930B can include data generated using sensing system 120. For example, the sensing data 930B can include one or more of LiDAR data, radar data, sonar data, or camera data (e.g., image data). In some implementations, the sensing data 930B can include raw data from the one or more sensing components. In some implementations, perception data 930C can include data generated using data processing system 130, an in particular perception system 132 of data processing system 130. In some implementations, sensing data can be aggregated and/or processed by perception system 132 to generated perception data 930C. It can be noted that sensing data 930B and perception data 930C can include real sensing data and real perception data (of the real-world environment), respectively, synthetic sensing data and synthetic perception data (computer-generated environmental features), respectively, or a combination thereof.

In some implementations, the initial roadgraph 930D can be similar to the initial roadgraph as described herein, such as roadgraph 352A of FIG. 3B. In some implementations, the initial roadgraph can include the initial AV driving path and one or more static features of the road.

In some implementations, the zone data 930E can be similar to zone data as described herein, such as zone data 520 of FIG. 5. In some implementations, zone data 930E can identify one or more obstacles of a construction zone. In some implementations, the zone data 930E can be included in the initial roadgraph 930D.

In some implementations, subsequent to generating a training set and training machine learning model 260 using the training set, the machine learning model 260 may be further trained (e.g., additional data for a training set) or adjusted (e.g., adjusting weights associated with input data of the machine learning model 260, such as connection weights in a neural network) using additional training inputs 330 and target outputs 340.

The methods as described herein (e.g., method 1000, 1100, and 1200) and/or each of the aforementioned methods' individual functions, routines, subroutines, or operations can be performed by a processing device, having one or more processing units (CPU) and memory devices communicatively coupled to the CPU(s). In some implementations, the aforementioned methods can be performed by a single processing thread or alternatively by two or more processing threads, each thread executing one or more individual functions, routines, subroutines, or operations of the method. The aforementioned methods as described below can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some implementations, method 1000 can be performed by AV driving path engine 251, such as AV driving path engine of AV development platform 220 and/or by training set generator 231 of FIG. 2. In some implementations, method 1100 can be performed by training set generator 231 of FIG. 2 and/or by AV driving path engine 251 of FIG. 2. In some implementations, method 1100 can be performed by AV driving path trained model 142 of FIG. 1 and/or by AV driving path engine 251 of FIG. 2. Although shown in a particular sequence or order, unless otherwise specified, the order of the operations can be modified. Thus, the illustrated implementations should be understood only as examples, and the illustrated operations can be performed in a different order, while some operations can be performed in parallel. Additionally, one or more operations can be omitted in some implementations. Thus, not all illustrated operations are required in every implementation, and other process flows are possible. In some implementations, the same, different, fewer, or greater operations can be performed. It may be noted that elements of preceding figures may be used herein to help describe FIGS. 10, 11 and 12.

The methods as described herein (e.g., method 1000, 1100, and 1200) are performed by processing logic that may include hardware (circuitry, dedicated logic, etc.), software (e.g., instructions run on a processing device), or a combination thereof. In some implementations, some or all the operations of methods may be performed by one or more components of AV 100 of FIG. 1 and/or system 200 of FIG. 2.

Figure 10:
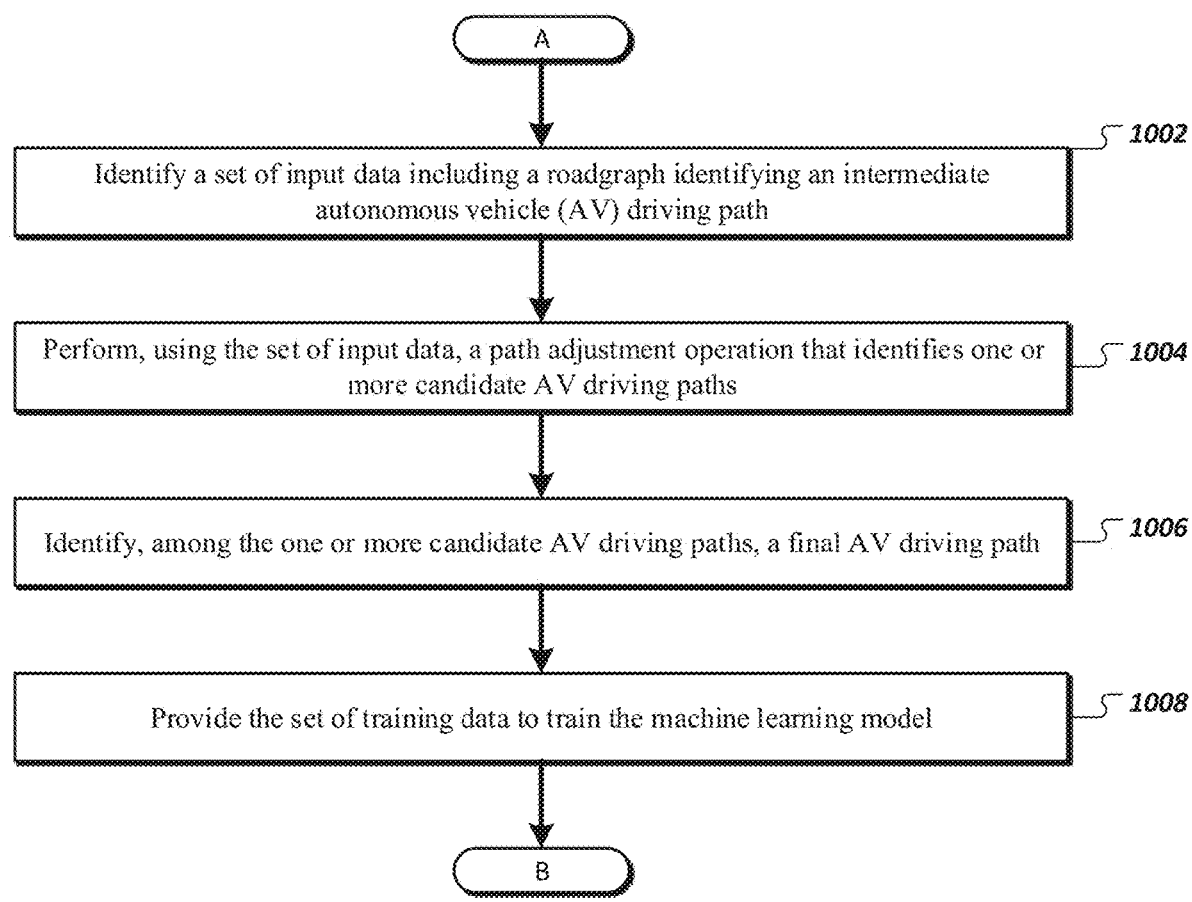
FIG. 10 depicts a flow diagram of an example method for generating AV driving paths (e.g., labels) for training a machine learning model, in accordance with implementations of the disclosure.

FIG. 10 depicts a flow diagram of an example method for generating AV driving paths (e.g., labels) for training a machine learning model, in accordance with implementations of the disclosure.

At operation 1002 of method 1000, processing logic identifies a set of input data including a roadgraph identifying an intermediate autonomous vehicle (AV) driving path. In some implementations, processing logic identifies a set of input data including a roadgraph identifying an intermediate autonomous vehicle (AV) driving path related to a scene representing an environment proximate an AV. In some implementations, the intermediate AV driving path reflects modifications to an initial (AV) driving path to avoid one or more obstacles obstructing the initial AV driving path.

In some implementations, the scene includes a construction zone scene. In some implementations, the one or more obstacles are of the construction zone scene.

At operation 1004, processing logic performs, using the set of input data, a path adjustment operation that identifies one or more candidate AV driving paths. In some implementations, processing logic performs, using the set of input data, a path adjustment operation that identifies one or more candidate AV driving paths based on the intermediate AV driving path and determines a cost value for each of the one or more candidate AV driving paths.

In some implementations, to perform, using the set of input data, the path adjustment operation that identifies the one or more candidate AV driving paths that avoid the one or more obstacles, processing logic performs a coarse adjustment operation that generates, based on the one or cost terms, a coarse AV driving path including a polyline path. In some implementations, processing logic performs a fine adjustment operation that generates, based on the coarse AV driving path, the final AV driving path that includes a continuous curved path having one or more continuous curvatures.

In some implementations, the path adjustment operation identifies the one or more candidate AV driving paths that avoid the one or more obstacles based on one or more cost terms. In some implementations, the one or more cost terms include a follow path cost term that encourages the one or more candidate AV driving paths to stay close to the intermediate AV driving path.

In some implementations, the one or more cost terms include a lane cost term that discourages the one or more candidate AV driving paths from deviating from an initial lane. In some implementations, the one or more cost terms include a smooth path cost term that encourage the one or more candidate AV paths to be smooth. In some implementations, the one or more cost terms include an obstacle cost term that forbids the one or more candidate AV driving paths to hit the one or more obstacles.

At operation 1006, processing logic identifies, among the one or more candidate AV driving paths, a final AV driving path. In some implementations, processing logic identifies, among the one or more candidate AV driving paths, a final AV driving path having a cost value that satisfies an evaluation criterion. In some implementations, the evaluation criterion is a cost value having a lowest value. In some implementations, the evaluation criterion is a cost value that is below a threshold cost value. In some implementations, the final AV driving path is to be included in the set of training data as a target output paired with training input comprising scene data identifying the scene.

In some implementations, the intermediate AV driving path can include a polyline path. In some implementations, the final AV driving path includes a continuous curved path with one or more continuous curvatures.

In some implementations, the final AV driving path includes at least one of a path shift with respect to the initial AV driving path, or a path merge into another AV driving path of the roadgraph.

At operation 1008, processing logic provides the set of training data to train the machine learning model.

Figure 11:
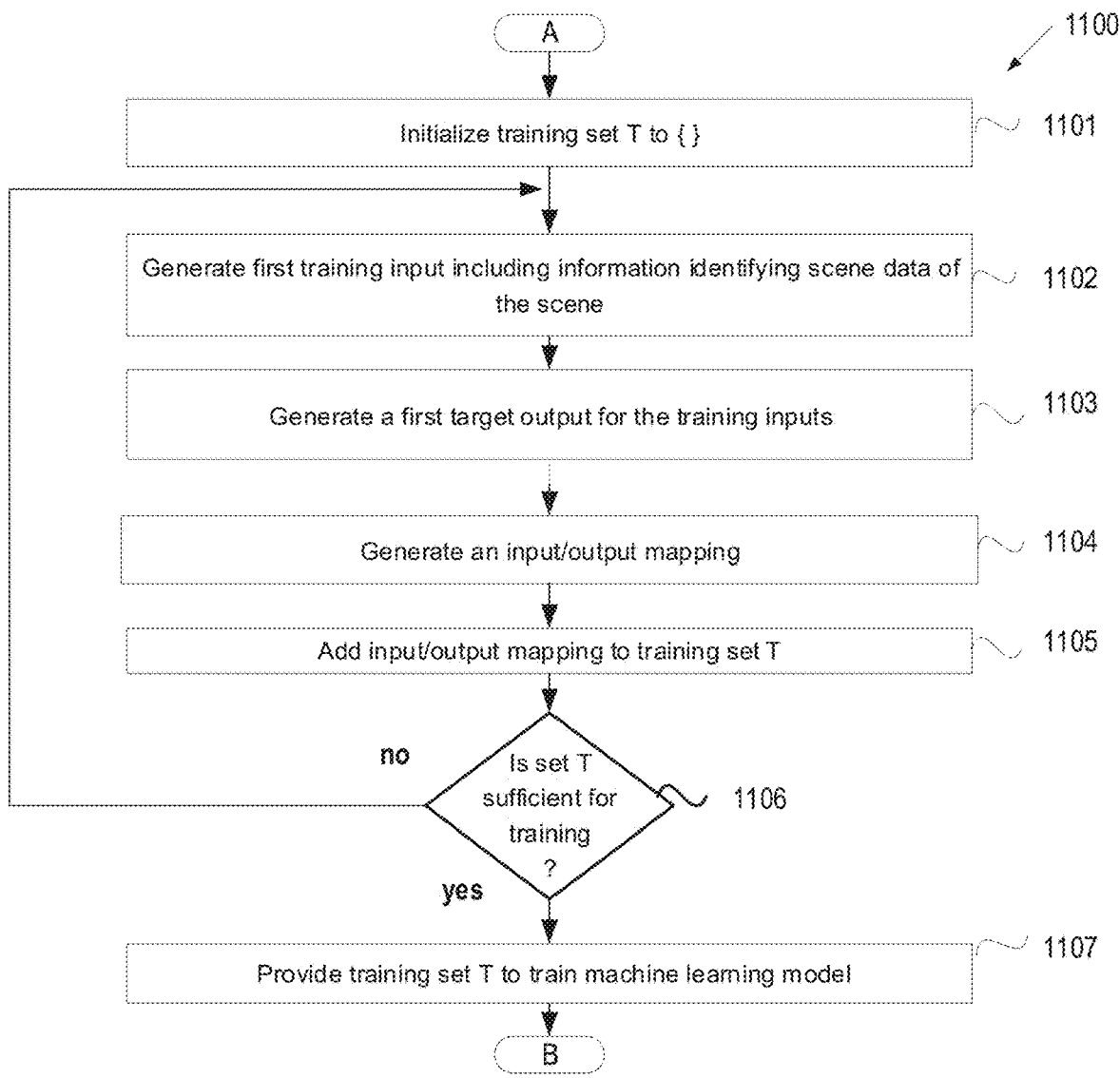
FIG. 11 depicts a flow diagram of one example method for training a machine learning model, in accordance with some implementations of the disclosure.

FIG. 11 depicts a flow diagram of one example method 1100 for training a machine learning model, in accordance with some implementations of the disclosure.

Method 1100 generates training data for a machine learning model, such as a machine learning model using information pertaining to an autonomous vehicle (AV) driving path that avoids one or more obstacles of a construction zone.

In some implementations, at block 1101 processing logic implementing method 1100 initializes a training set T to an empty set.

At block 1102, processing logic generates first training input that includes scene data of a scene. In some implementations, the first training input includes scene data of a scene representing an environment that is proximate an AV and that includes the one or more obstacles of the construction zone.

At block 1103, processing logic generates a first target output for one or more of the training inputs. In some implementations, the first target output identifies a final AV driving path that avoids the one or more obstacles of the construction zone.

In some implementations, the final AV driving path was generated using a set of input data for a path adjustment operation. In some implementations, the set of input data includes a roadgraph identifying an intermediate autonomous vehicle (AV) driving path related to and reflecting modifications to an initial (AV) driving path to avoid the one or more obstacles obstructing the initial AV driving path. In some implementations, the path adjustment operation identifies, among one or more candidate AV driving paths, the final AV driving path based on the intermediate AV driving path and a cost value for each of the one or more candidate AV driving paths.

In some implementations, the path adjustment operation identifies the one or more candidate AV driving paths that avoid the one or more obstacles based on one or more cost terms. In some implementations, the one or more cost terms include a follow cost term that encourages the one or more candidate AV driving paths to stay close to the intermediate AV driving path.

In some implementations, the path adjustment operation includes a coarse adjustment operation that generates, based on the one or cost terms, a coarse AV driving path including a polyline path. In some implementations, the path adjustment operation includes a fine adjustment operation that generates, based on the coarse AV driving path, the final AV driving including a continuous curved path with one or more continuous curvatures.

In some implementations, the one or more cost terms include one or more of a lane cost term that discourages the one or more candidate AV driving paths to deviate from an initial lane, a smooth path cost term that encourages the one or more candidate AV paths to be smooth, or an obstacle cost term that forbids the one or more candidate AV driving paths to hit the one or more obstacles.

In some implementations, the intermediate AV driving path includes a polyline path. In some implementations, the final AV driving path includes a continuous curved path with one or more continuous curvatures.

At block 1104, processing logic optionally generates mapping data that is indicative of an input/output mapping. The input/output mapping (or mapping data) may refer to the training input (e.g., one or more of the training inputs described herein), the set of target outputs for the training input (e.g., one or more of the target outputs described herein), and an association between the training input(s) and the target output(s). In some implementation, the first training input is mapped to the first target output. At block 1105, processing logic adds the mapping data generated at block 1104 to training set T.

At block 1106, processing logic branches based on whether training set T is sufficient for training machine learning model 260. If so, execution proceeds to block 1107, otherwise, execution continues back at block 1102. It should be noted that in some implementations, the sufficiency of training set T may be determined based simply on the number of input/output mappings in the training set, while in some other implementations, the sufficiency of training set T may be determined based on one or more other criteria (e.g., a measure of diversity of the training examples, accuracy exceeding a threshold, etc.) in addition to, or instead of, the number of input/output mappings.

At block 1107, processing logic provides training set T to train machine learning model 260. In one implementation, training set T is provided to training engine 241 of server machine 240 to perform the training. In the case of a neural network, for example, input values of a given input/output mapping (e.g., numerical values associated with training inputs 930) are input to the neural network, and output values (e.g., numerical values associated with target outputs 940) of the input/output mapping are stored in the output nodes of the neural network. The connection weights in the neural network are then adjusted in accordance with a learning algorithm (e.g., back propagation, etc.), and the procedure is repeated for the other input/output mappings in training set T. After block 1107, machine learning model 260 can be trained using training engine 241 of server machine 240. The trained machine learning model 260 may be implemented by AV driving path model 142 and/or AV driving path engine 251. In some implementations, the machine learning model 260 is a supervised machine learning model. In some implementations, the one or more training inputs are paired with the set of target outputs to train the machine learning model 260.

Figure 12:
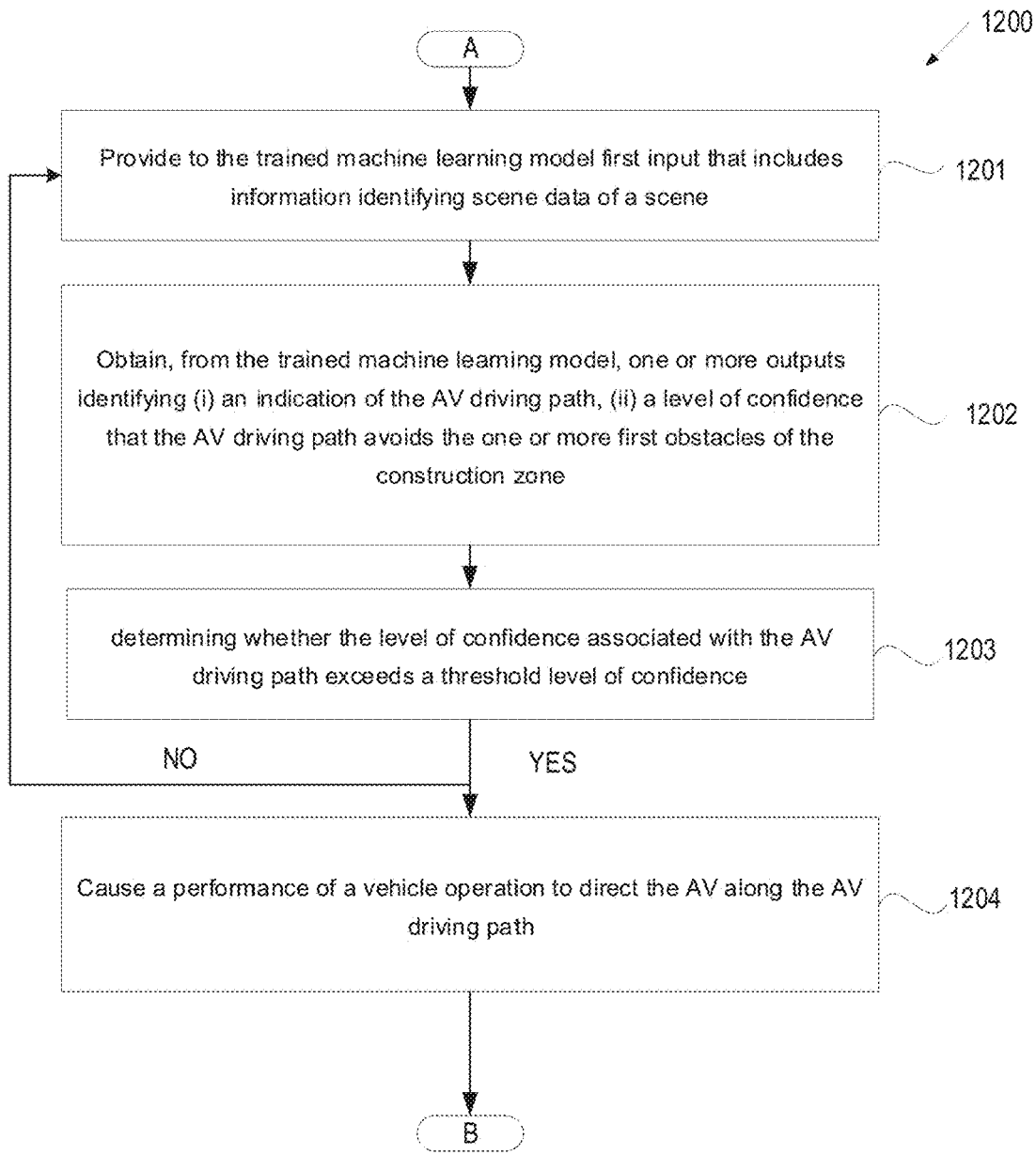
FIG. 12 depicts a flow diagram of one example method for using the trained machine learning model with respect to information pertaining to an autonomous vehicle (AV) driving path that avoids one or more first obstacles of a construction zone, in accordance with some implementations of the disclosure.

FIG. 12 depicts a flow diagram of one example method 1200 for using the trained machine learning model with respect to information pertaining to an autonomous vehicle (AV) driving path that avoids one or more first obstacles of a construction zone, in accordance with some implementations of the disclosure.

At block 1201 of method 1200 processing logic provides to the trained machine learning model first input that includes information identifying scene data of a scene.

In some implementations, first input includes scene data of a first scene representing an environment that is proximate an AV and that includes the one or more first obstacles of the construction zone.

At block 1202, processing logic obtains, from the trained machine learning model, one or more outputs identifying (i) an indication of the AV driving path, (ii) a level of confidence that the AV driving path avoids the one or more first obstacles of the construction zone.

In some implementations, the trained machine learning model was trained using a set of training data that includes a target output that further includes a final AV driving path paired with training input including scene data identifying a second scene of a different construction zone (e.g., different than the construction scene the AV is currently navigating). In some implementations, the final AV driving path was generated using a set of input data with a path adjustment operation. In some implementations, the set of input data includes a roadgraph identifying an intermediate autonomous vehicle (AV) driving path related to and reflecting modifications to an initial (AV) driving path to avoid one or more second obstacles obstructing the initial AV driving path. In some implementations, the path adjustment operation identifies, among one or more candidate AV driving paths, the final AV driving path based on the intermediate AV driving path and a cost value for each of the one or more candidate AV driving paths.

In some implementations, the path adjustment operation includes a coarse adjustment operation that generates, based on the one or cost terms, a coarse AV driving path including a polyline path. In some implementations, the path adjustment operation includes a fine adjustment operation that generates, based on the coarse AV driving path, the final AV driving comprising a continuous curved path having one or more continuous curvatures.

In some implementations, the path adjustment operation identifies the one or more candidate AV driving paths that avoid the one or more second obstacles based on one or more cost terms including a follow cost term that encourages the one or more candidate AV driving paths to stay close to the intermediate AV driving path.

In some implementations, the intermediate AV driving path includes a polyline path. In some implementations, the final AV driving path includes a continuous curved path with one or more continuous curvatures.

At block 1203, processing logic determines whether the level of confidence associated with AV driving path exceeds a threshold level of confidence. If the level of confidence associated with AV driving path exceeds a threshold level of confidence, processing logic proceeds to block 1204. If the level of confidence associated with AV driving path does not exceed a threshold level of confidence, processing logic proceeds to block 1201.

At block 1204, processing logic, causes a performance of a vehicle operation (e.g., vehicle action) to direct the AV along the AV driving path. In some implementations, responsive to determining that the level of confidence of the AV driving path exceeds the threshold level of confidence, processing logic causes a performance of a vehicle operation to direct the AV along the AV driving path. In some implementations, the vehicle operation can include one or more of operations related to the powertrain, steering or braking.

Figure 13:
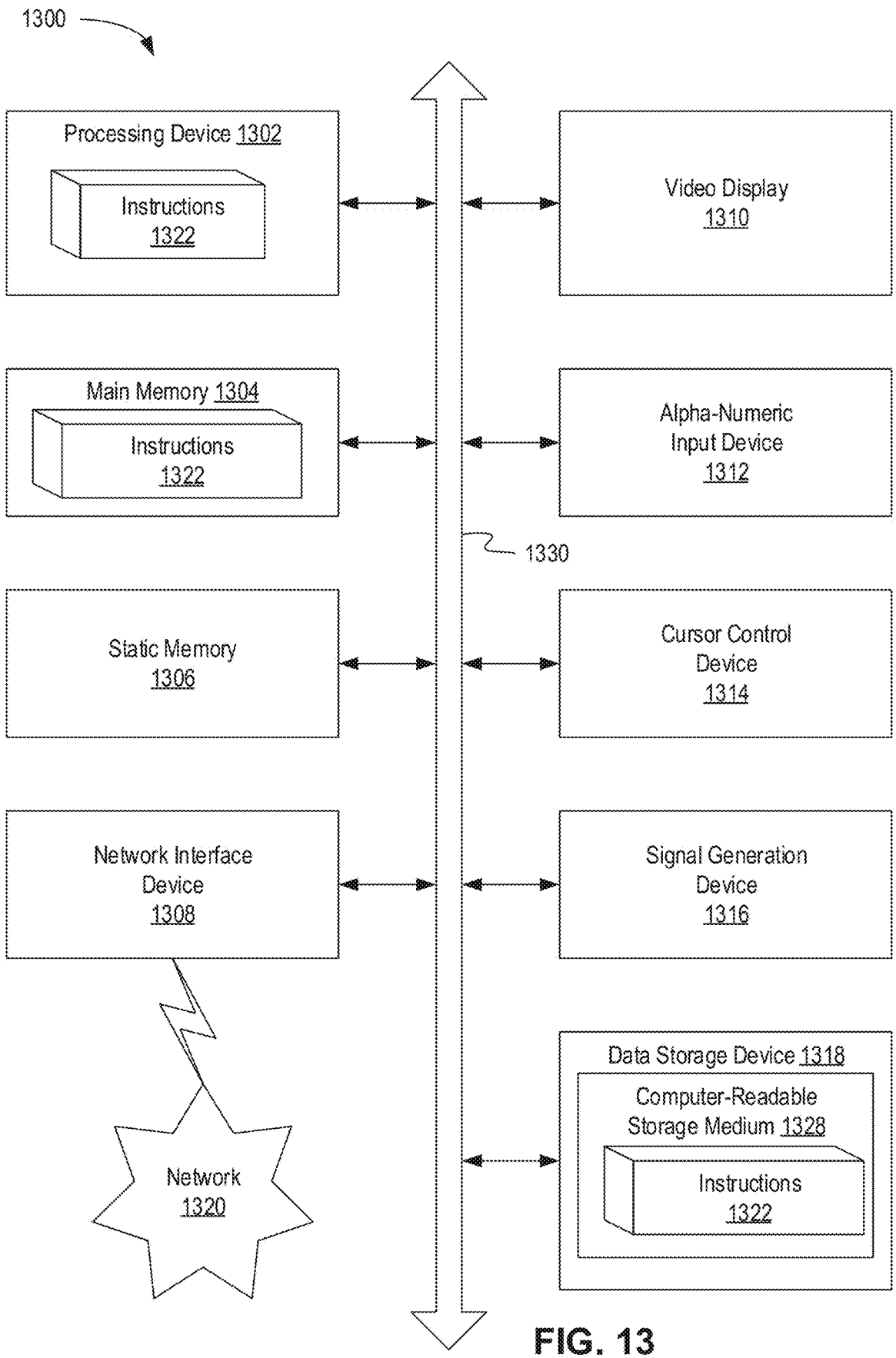
FIG. 13 depicts a block diagram of an example computer device within which a set of instructions, for causing the machine to perform any of the one or more methodologies discussed herein can be executed, in accordance with some implementations of the disclosure.

FIG. 13 depicts a block diagram of an example computer device 1300 within which a set of instructions, for causing the machine to perform any of the one or more methodologies discussed herein can be executed, in accordance with some implementations of the disclosure. Example computer device 1300 can be connected to other computer devices in a LAN, an intranet, an extranet, and/or the Internet. Computer device 1300 can operate in the capacity of a server in a client-server network environment. Computer device 1300 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" includes any collection of computers that individually or jointly execute a set (or multiple sets) of instructions to perform any one or more of the methods discussed herein. In some implementations, the computer device 1300 is AV server 250. In some implementations, the AV 101 includes computer device 1300 (e.g., AVCS 140 is computer device 1300).

Example computer device 1300 can include a processing device 1302 (also referred to as a processor or CPU), which can include instructions 1322, a main memory 1304 (e.g., read-only memory (ROM), flash memory, dynamic random access memory (DRAM) such as synchronous DRAM (SDRAM), etc.), a static memory 1306 (e.g., flash memory, static random access memory (SRAM), etc.), and a secondary memory (e.g., a data storage device 1318), which can communicate with each other via a bus 1330.

Processing device 1302 represents one or more general-purpose processing devices such as a microprocessor, central processing unit, or the like. More particularly, processing device 1302 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1302 can also be one or more special-purpose processing devices such as an application specific integrated circuit (ASIC), a field programmable gate array (FPGA), a digital signal processor (DSP), network processor, or the like.

Example computer device 1300 can further comprise a network interface device 1308, which can be communicatively coupled to a network 1320. Example computer device 1300 can further comprise a video display 1310 (e.g., a liquid crystal display (LCD), a touch screen, or a cathode ray tube (CRT)), an alphanumeric input device 1312 (e.g., a keyboard), a cursor control device 1314 (e.g., a mouse), and an acoustic signal generation device 1316 (e.g., a speaker).

Data storage device 1318 can include a computer-readable storage medium (or, more specifically, a non-transitory computer-readable storage medium) 1328 on which is stored one or more sets of executable instructions 1322.

Executable instructions 1322 can also reside, completely or at least partially, within main memory 1304 and/or within processing device 1302 during execution thereof by example computer device 1300, main memory 1304 and processing device 1302 also constituting computer-readable storage media. Executable instructions 1322 can further be transmitted or received over a network via network interface device 1308. Executable instructions 1322 can include one or more of AV driving path model 142 (e.g., including path adjustment module 252), AV driving path engine 251, training set generator 231, or training engine 241.

While the computer-readable storage medium 1328 is shown in FIG. 13 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" includes any medium that is capable of storing or encoding a set of instructions for execution by the machine that cause the machine to perform any one or more of the methods described herein. The term "computer-readable storage medium" includes, but is not limited to, solid-state memories, and optical and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the disclosure is not described with reference to any particular programming language. It will be appreciated that a variety of programming languages can be used to implement the teachings of the disclosure as described herein.

The disclosure can be provided as a computer program product, or software, that can include a machine-readable medium having stored thereon instructions, which can be used to program a computer system (or other electronic devices) to perform a process according to the disclosure. A machine-readable medium includes any mechanism for storing information in a form readable by a machine (e.g., a computer). In some implementations, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an embodiment," "one embodiment," "some embodiments," "an implementation," "one implementation," "some implementations," or the like throughout may or may not mean the same embodiment or implementation. One or more embodiments or implementations described herein may be combined in a particular embodiment or implementation. The terms "first," "second," "third," "fourth," etc. as used herein are meant as labels to distinguish among different elements and may not necessarily have an ordinal meaning according to their numerical designation.

In the foregoing specification, implementations of the disclosure have been described with reference to specific example implementations thereof. It will be evident that various modifications can be made thereto without departing from the broader spirit and scope of implementations of the disclosure as set forth in the following claims. The specification and drawings are, accordingly, to be regarded in an illustrative sense rather than a restrictive sense.

What is claimed is:

1. A system to generate a set of training data for training a machine learning model, comprising:
    a memory device; and
    a processing device, operatively coupled to the memory device, to:
    generate training input comprising scene data of a scene representing an environment that is proximate to an autonomous vehicle (AV) and that includes one or more obstacles obstructing an initial AV driving path; and
    generate target output for the training input, wherein to generate the target output, the processing device is to:
        identify a set of input data comprising a roadgraph identifying an intermediate AV driving path related to the scene representing the environment proximate to the AV, the intermediate AV driving path reflecting a modification to the initial AV driving path to avoid the one or more obstacles obstructing the initial AV driving path;
        perform, using the set of input data, a path adjustment operation that identifies one or more candidate AV driving paths based on the intermediate AV driving path and determines a cost value for each of the one or more candidate AV driving paths; and
        identify, among the one or more candidate AV driving paths, a final AV driving path having a cost value that satisfies an evaluation criterion, wherein the final AV driving path is included in the set of training data as the target output paired with the training input comprising the scene data identifying the scene.

2. The system of claim 1, wherein the path adjustment operation identifies the one or more candidate AV driving paths that avoid the one or more obstacles based on one or more cost terms comprising a follow path cost term that encourages the one or more candidate AV driving paths to stay close to the intermediate AV driving path.

3. The system of claim 2, wherein the one or more cost terms comprise one or more of a lane cost term that discourages the one or more candidate AV driving paths from deviating from an initial lane, a smooth path cost term that encourages the one or more candidate AV paths to be smooth, or an obstacle cost term that forbids the one or more candidate AV driving paths to hit the one or more obstacles.

4. The system of claim 1, wherein the intermediate AV driving path comprises a polyline path, and wherein the final AV driving path comprises a continuous curved path with continuous curvatures.

5. The system of claim 1, wherein the scene comprises a construction zone scene, and wherein the one or more obstacles are of the construction zone scene.

6. The system of claim 1, wherein the final AV driving path comprises at least one of: a path shift with respect to the initial AV driving path, or a path merge into another autonomous vehicle driving path of the roadgraph.

7. The system of claim 2, wherein to perform, using the set of input data, the path adjustment operation that identifies the one or more candidate AV driving paths that avoid the one or more obstacles, the processing device to:
    perform a coarse adjustment operation that generates, based on the one or more cost terms, a coarse AV driving path comprising a polyline path; and
    perform a fine adjustment operation that generates, based on the coarse AV driving path, the final AV driving path comprising a continuous curved path having one or more continuous curvatures.

8. The system of claim 1, the processing device further to:
    provide the set of training data to train the machine learning model.

9. A method for training a machine learning model using information pertaining to an autonomous vehicle (AV) driving path that avoids one or more obstacles, the method comprising:
    generating, by a processing device, training data for the machine learning model, wherein generating the training data comprises:
        generating first training input comprising scene data of a scene representing an environment that is proximate to an AV and that includes the one or more obstacles obstructing an initial AV driving path; and
        generating a first target output for the first training input, wherein the first target output identifies a final AV driving path that avoids the one or more obstacles,
            wherein the final AV driving path was generated using a set of input data with a path adjustment operation, the set of input data comprising a roadgraph identifying an intermediate AV driving path related to and reflecting a modification to the initial AV driving path to avoid the one or more obstacles obstructing the initial AV driving path, and
            wherein the path adjustment operation identifies, among one or more candidate AV driving paths, the final AV driving path based on the intermediate AV driving path and a cost value for each of the one or more candidate AV driving paths; and
    providing the training data to train the machine learning model on (i) a set of training inputs comprising the first training input, and (ii) a set of target outputs comprising the first target output.

10. The method of claim 9, wherein the path adjustment operation identifies the one or more candidate AV driving paths that avoid the one or more obstacles based on one or more cost terms comprising a follow cost term that encourages the one or more candidate AV driving paths to stay close to the intermediate AV driving path.

11. The method of claim 10, wherein the one or more cost terms comprise one or more of a lane cost term that discourages the one or more candidate AV driving paths to deviate from an initial lane, a smooth path cost term that encourages the one or more candidate AV paths to be smooth, or an obstacle cost term that forbids the one or more candidate AV driving paths to hit the one or more obstacles.

12. The method of claim 9, wherein the intermediate AV driving path comprises a polyline path, and wherein the final AV driving path comprises a continuous curved path with one or more continuous curvatures.

13. The method of claim 10, wherein the path adjustment operation comprises:
- a coarse adjustment operation that generates, based on the one or more cost terms, a coarse AV driving path comprising a polyline path, and
- a fine adjustment operation that generates, based on the coarse AV driving path, the final AV driving path comprising a continuous curved path with one or more continuous curvatures.

14. The method of claim 9, wherein the first training input is mapped to the first target output.

15. The system of claim 8, wherein the trained machine learning model is configured to generate one or more outputs identifying (i) an indication of another final AV driving path that avoids one or more other obstacles, and (ii) a level of confidence that the other final AV driving path avoids the one or more other obstacles.

16. The system of claim 15, wherein the trained machine learning model is configured to generate the one or more outputs based on one or more inputs comprising other scene data of another scene representing another environment that is proximate to another AV and that includes the one or more other obstacles.

17. The system of claim 15, wherein the other final AV driving path comprises a continuous curved path with one or more continuous curvatures.

18. The method of claim 9, wherein the trained machine learning model is configured to generate one or more outputs identifying (i) an indication of another final AV driving path that avoids one or more other obstacles, and (ii) a level of confidence that the other final AV driving path avoids the one or more other obstacles.

19. The method of claim 18, wherein the trained machine learning model is configured to generate the one or more outputs based on one or more inputs comprising other scene data of another scene representing another environment that is proximate to another AV and that includes the one or more other obstacles.

20. The method of claim 18, wherein the other final AV driving path comprises a continuous curved path with one or more continuous curvatures.

21. A non-transitory computer readable storage medium comprising instructions, which when executed by a processing device, cause the processing device to perform operations comprising:
- generating training input comprising scene data of a scene representing an environment that is proximate to an autonomous vehicle (AV) and that includes one or more obstacles obstructing an initial AV driving path; and
- generating target output for the training input, wherein generating the target output comprises:
  - identifying a set of input data comprising a roadgraph identifying an intermediate AV driving path related to the scene representing the environment proximate to the AV, the intermediate AV driving path reflecting a modification to the initial AV driving path to avoid the one or more obstacles obstructing the initial AV driving path;
  - performing, using the set of input data, a path adjustment operation that identifies one or more candidate AV driving paths based on the intermediate AV driving path and determines a cost value for each of the one or more candidate AV driving paths; and
  - identifying, among the one or more candidate AV driving paths, a final AV driving path having a cost value that satisfies an evaluation criterion, wherein the final AV driving path is included in the set of training data as the target output paired with the training input comprising the scene data identifying the scene.

* * * * *